US008385248B2

(12) United States Patent
Sung et al.

(10) Patent No.: US 8,385,248 B2
(45) Date of Patent: Feb. 26, 2013

(54) SYSTEM AND METHOD FOR MULTICAST AND BROADCAST SERVICE

(75) Inventors: Su-Lyun Sung, Anyang (KR); Dong-Hyun Lee, Yongin (KR)

(73) Assignee: Posco ICT Co., Ltd., Pohang (KR)

( * ) Notice: Subject to any disclaimer, the term of this patent is extended or adjusted under 35 U.S.C. 154(b) by 335 days.

(21) Appl. No.: 12/747,507

(22) PCT Filed: Dec. 12, 2008

(86) PCT No.: PCT/KR2008/007397
§ 371 (c)(1),
(2), (4) Date: Jun. 10, 2010

(87) PCT Pub. No.: WO2009/075553
PCT Pub. Date: Jun. 18, 2009

(65) Prior Publication Data
US 2010/0278091 A1 Nov. 4, 2010

(30) Foreign Application Priority Data

Dec. 13, 2007 (KR) .................. 10-2007-0130005
Dec. 21, 2007 (KR) .................. 10-2007-0135664
Dec. 21, 2007 (KR) .................. 10-2007-0135875
Dec. 28, 2007 (KR) .................. 10-2007-0139808

(51) Int. Cl.
*H04H 20/71* (2008.01)
(52) U.S. Cl. ........ 370/312; 370/329; 370/331; 370/341; 370/432
(58) Field of Classification Search .............. 370/312, 370/329, 331, 341, 432; 455/436
See application file for complete search history.

(56) References Cited

U.S. PATENT DOCUMENTS

| 2004/0087320 | A1* | 5/2004 | Kim et al. ............... 455/458 |
| 2005/0271007 | A1* | 12/2005 | Hwang et al. ............ 370/329 |
| 2006/0252439 | A1* | 11/2006 | Cai .......................... 455/515 |
| 2007/0105600 | A1* | 5/2007 | Mohanty et al. ......... 455/574 |
| 2007/0197235 | A1 | 8/2007 | Zhang |
| 2007/0213081 | A1 | 9/2007 | Zhang |
| 2008/0056219 | A1* | 3/2008 | Venkatachalam ........ 370/342 |
| 2008/0253322 | A1* | 10/2008 | So et al. .................. 370/329 |
| 2009/0323634 | A1* | 12/2009 | Kim et al. ................ 370/331 |

FOREIGN PATENT DOCUMENTS

| KR | 1020030089340 A | 11/2003 |
| KR | 1020040084062 A | 10/2004 |
| KR | 1020050009662 A | 1/2005 |

(Continued)

OTHER PUBLICATIONS

International Search Report for PCT/KR2008/007397 filed Dec. 12, 2008.

(Continued)

*Primary Examiner* — Mark Rinehart
*Assistant Examiner* — Mang Yeung

(57) ABSTRACT

The present invention relates to a system and method for providing Multicast and Broadcast Service (MCBCS). According to the present invention, the MCBCS system and method supports session start and data path registration procedures, join and leave procedure for providing the MCBCS with static or dynamic multicast service schemes, and supports procedures for providing to mobile stations operating in idle mode. Accordingly, the present invention enables effectively implementing the MCBCS in a wireless communication system, particularly in WiMAX system, and provides the MCBCS according to the mobile stations operating in idle mode.

3 Claims, 13 Drawing Sheets

FOREIGN PATENT DOCUMENTS

| | | |
|---|---|---|
| KR | 1020050043235 A | 5/2005 |
| KR | 1020050046485 A | 5/2005 |
| KR | 1020050100859 A | 10/2005 |
| KR | 1020060034607 A | 4/2006 |
| KR | 1020060060223 A | 6/2006 |
| KR | 100691816 B1 | 2/2007 |
| KR | 100715518 B1 | 4/2007 |
| WO | WO 2007/056514 A1 | 5/2007 |

OTHER PUBLICATIONS

Written Opinion of the International Searching Authority for PCT/KR2008/007397 filed Dec. 12, 2008.

* cited by examiner

SYSTEM AND METHOD FOR MULTICAST AND BROADCAST SERVICE

TECHNICAL FIELD

The present invention relates to a wireless communication system and, in particular, to a system and method for providing MultiCast and BroadCast Service (MCBCS) in a wireless communication system.

BACKGROUND ART

Communication systems are evolving to support various multimedia services such as broadcast, video, and message streaming services. Recently, many researches are being carried out for next generation communication systems to provide end users with the various types of services requiring different Quality of Service (QoS).

Next generation communication systems aim to provide various services by interworking between wire/wireless networks. Herein, next generation communication systems are Broadband Wireless Access (BWA) technologies such as Wireless Broadband (WiBro) and Worldwide Interoperability for Microwave Access (WiMAX) based on the institute of Electrical and Electronics Engineers (IEEE) 802.16 standards.

However, WiMAX does not specify any detailed mechanism in order for a service provider to provide multimedia streaming services such as broadcast, video, and message streaming services to users with multicast/broadcast scheme. Accordingly, in order to implement the MCBCS in a WiMAX system, it is required to specify mechanism for providing the MCBCS to users with static and dynamic multicast service schemes, broadcast service scheme, and mechanism to establish data path for providing the MCBCS to users, e.g. mobile stations (MSs) having mobility and fixity with the multicast/broadcast services schemes. Furthermore, in order to provided the MCBCS in the WiMAX system, it is required to implement mechanisms for supporting mobility of the MSs, checking the presence of MSs within a MCBCS zone (particularly, the MSs operating in idle mode) for minimizing power consumption, and managing the MCBCS depending on the presence of the MSs.

DISCLOSURE OF INVENTION

Technical Problem

Accordingly, an aspect of the present invention is to provide a system and method for providing MCBCS in a wireless communication system.

Another aspect of the present invention is to provide a system and method for providing MCBCS that is capable of supporting session start and data path registration procedures in a wireless communication system.

Further, another aspect of the present invention is to provide a system and method for providing MCBCS that is capable of supporting a static and a dynamic multicast service in a wireless communication system.

Also, another aspect of the present invention is to provide a system and method for providing MCBCS that is capable of supporting MCBCS join and leave procedures in a wireless communication system.

In addition, another aspect of the present invention is to provide a system and method for providing MCBCS in static and dynamic multicasts within a WiMAX system.

Also, another aspect of the present invention is to provide a system and method for providing MCBCS optimized to a WiMAX system in a static and a dynamic multicast manners.

Further, another aspect of the present invention is to provide a system and method for providing MCBCS to MSs operating in idle mode within a MCBCS transmission zone in a wireless communication system.

Technical Solution

According to one aspect of the present invention, there is provided a method for supporting Multicast and Broadcast Service (MCBCS) in a wireless communication system. The method includes receiving, at an Access Service Network Gateway (ASN GW), a session start request message from an MCBCS server, and transmitting the session start request message together with a resource reservation and data path registration request messages to base stations providing the MCBCS to a mobile station; performing, at the base stations, a resource reservation and data path registration procedure based on the session start request message, and transmitting a session start response message together with a resource reservation and data path registration response messages to the ASN GW; and transmitting, at the ASN GW, the session start response message to the MCBCS server, registering data path with the MCBCS server.

According to another aspect of the present invention, there is provided a method for providing Multicast and Broadcast Service (MCBCS) in a wireless communication system. The method includes receiving, at an Access Service Network Gateway (ASN GW), a join initiate message from a mobile station to be provided with an MCBCS based on a service announce information after performing a data path registration procedure; transmitting, at the ASN GW, a join request message to a base station upon receipt of the join initiate message; performing, at the base station, a dynamic service addition procedure with the mobile station based on the join request message, and transmitting a join response message to the ASN GW; and recognizing, at the ASN GW, an MCBCS join by receiving the join response message.

According to further another aspect of the present invention, there is provided a method for providing Multicast and Broadcast service (MCBCS) in a wireless communication system. The method includes receiving, at an access service network gateway (ASN GW), a join initiate message from a mobile station; checking, at the ASN GW, if the mobile station is a first mobile station within a multicast and broadcast service (MBS) zone upon receipt of the join initiate message, an MCBCS content, and transmitting a resource reservation and data path registration request messages according to the MCBCS content to a base station; performing, at the base station, a dynamic service addition procedure with the mobile station upon receipt of the resource reservation and data path registration request messages, and transmitting a resource reservation and data path registration response messages to the ASN GW according to the resource reservation and data path registration request messages; and receiving, at the ASN GW, the resource reservation and data path registration response messages, and updating the MCBCS.

According to yet another aspect of the present invention, there is provided a method for providing Multicast and Broadcast Service (MCBCS) in a wireless communication system. The method includes receiving, an Access Service Network Gateway (ASN GW), an leave message from a mobile station to stop being provided with an MCBCS; transmitting, at the ASN GW, a leave indication message to an MCBCS server upon receipt of the leave message, receiving a leave response message from the MCBCS server according to the leave indication message, and transmitting a leave request message to the base station according to the leave response message; performing, at the base station, a dynamic service deletion procedure with the mobile station upon receipt of the leave request message, and transmitting a leave response message to the ASN GW according to the leave request message; and receiving, at the ASN GW, the leave response message from the base station, transmitting, if the mobile station is a last mobile station within an Multicast and Broadcast Service (MBS) zone, a path deregistration request message to the base station, receiving a path deregistration response message from the base station according to the path deregistration request message, transmitting a multicast tree leave message to the MCBCS server according to the path deregistration response message, and leaving a multicast tree.

According to further another aspect of the present invention, there is provided a method for providing Multicast and Broadcast Service (MCBCS) in a wireless communication system. The method includes transmitting, at an MCBCS server, when an MCBCS to be provided to a mobile station exists, to an Access Service Network Gateway (ASN GW) a service request message including an identifier of a base station providing the mobile station with the MCBCS and a connection information of a serving network; transmitting, at the ASN GW, the base station a service join request message including a multicast connection identifier, service flow identifier, and an Internet Protocol multicast address corresponding to the MCBCS, upon receipt of the service request message; performing, at the base station, a dynamic service addition procedure with the mobile station upon receipt of the service join request message, and transmitting a service join response message to the ASN GW according to the service join request message; and recognizing, at the ASN GW, the MCBCS join by receiving the service join response message.

According to further another aspect of the present invention, there is provided a method for supporting Multicast and Broadcast Service (MCBCS) in a wireless communication system. The method includes detecting, at a base station, initiate entry into an idle mode of a mobile station within a Multicast and Broadcast Service (MBS) zone by receiving a deregistration request message from the mobile station, and transmitting a path deregistration request message to an Access Service Network Gateway (ASN GW) by detecting the initiate entry into the idle mode; and transmitting, at the ASN GW, a path deregistration response message to the base station upon receipt of the path deregistration request message, and updating an identifier of the MBS zone and an identifier of a serving network corresponding to the mobile station in a context of the mobile station.

According to yet another aspect of the present invention, there is provided a method for supporting Multicast and Broadcast Service (MCBCS) in a wireless communication system. The method includes monitoring a number of MCBCS mobile stations including mobile stations operating in idle mode within a Multicast and Broadcast Service (MBS) zone; and determining whether to provide the MCBCS, based on the number of MCBCS mobile stations.

According to still another aspect of the present invention, there is provided a system for supporting Multicast and Broadcast Service (MCBCS). The system includes a mobile station, a base station, an Access Service network Gateway (ASN GW), an MCBCS server, and a policy server, wherein the ASN GW includes a proxy module for supporting an assignment function of multicast connection identifiers and radio resources, a layer 2 security function for MCBCS contents, a management function of the mobile station and resources for the MCBCS, and a function interworking with the policy server; and a Data Path Function (DPF) module for supporting registration and deregistration of a dynamic MCBCS data path.

Advantageous Effects

The present invention provides a system and method for providing an MCBCS in a communication in detail. The present invention provides a system and method for providing an MCBCS for support session start, data path registration, subscription procedures for the MCBCS, and also support join and leave procedures for the MC BCS in static and dynamic modes, and proposes detailed system and method for supporting MCBCS to the mobile station operating in idle mode.

Also, the present invention provides a system and method for supporting an MCBCS of a WiMAX system in a dynamic mode in consideration of communication environment of an MCBCS zone and mobile stations operating in idle mode.

BRIEF DESCRIPTION OF DRAWINGS

The above and other aspects, features and advantages of the present invention will become more apparent from the following detailed description when taken in conjunction with the accompanying drawings in which.

MODE FOR THE INVENTION

Figure 1:
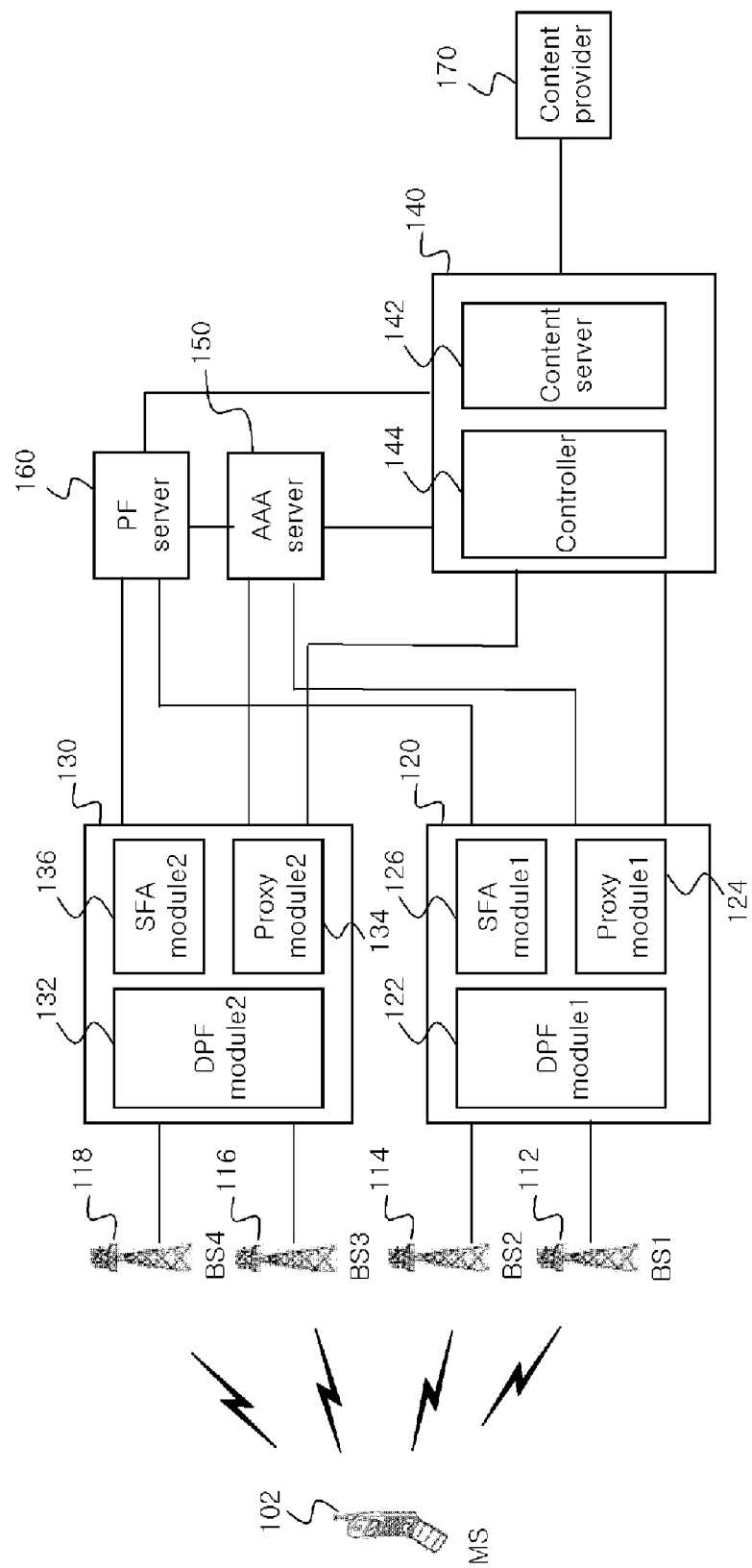
FIG. 1 is a diagram schematically illustrating a structure of a WiMAX system for providing MCBCS to an MS in communication system according to an embodiment of the present invention.

Preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for clarity and conciseness.

The present invention relates to communication systems, e.g., a Broadband Wireless Access (BWA) communication represented by Wireless Broadband (WiBro) or Mobile Worldwide Interoperability for Microwave Access (WiMAX) based on IEEE 802.16 standards. And the present invention provides a system and method for providing MultiCast and BroadCast Service (MCBCS) in a wireless communication system. Although the system for MCBCS is described in association with an IEEE 802.16 system or WiMAX system in the following description, the present invention can be applied to other types of communication system and provided for various other types of services.

In the following description, in order to provide user, e.g., mobile stations (MSs) having mobility and fixity with the MCBCS, the WiMAX system operates with session start, data path registration, and subscription procedures for providing the MCBCS. The WiMAX system provides the MCBCS to the MSs with a static/dynamic multicast service schemes, and the present invention provides the MCBCS by supporting join and leave the WiMAX system which provides the MCBCS to MS with the static/dynamic multicast service schemes, i.e., by supporting MCBCS join and leave procedures of the MS. In the following description, the WiMAX system supports to provide dynamic MCBCS for the MS in which the MS enters and exits the idle mode within the service area of the system.

FIG. 1 is a diagram schematically illustrating a structure of a WiMAX system for providing MCBCS to an MS in communication system according to an embodiment of the present invention.

Referring to FIG. 1, the WiMAX system includes an MS 102, Base stations (BSs) (i.e. BS1 112, BS2 114, BS3 116, and BS4 118) performing as Radio Access Station (RAS) for broadcasting or multicasting MCBCS data within their service areas, Access Service Network (ASN) gateways (GWs) (i.e. ASN GW1 120 and ASN GW2 130) for delivering the MCBCS contents, an MCBCS server 140 for controlling the MCBCS and providing contents, an Authentication Authorization Accounting (AAA) server 150 which is in charge of authentication, authorization, and accounting functions, a Policy Function (PF) server 160 which manages communication protocols for providing the MCBCS, and a content provider (CP) 170 which creates and provides MCBCS contents.

Here, a service area refers to a Multicast Broadcast Service (MBS) zone in which MBS services are provided by only Media Access Control (MAC) and Physical (PHY) layers of a set of BSs. The ASNs are networks for providing the MCBCS within the MBS zone in the WiMAX system. In this embodiment, it is assumed that the MS 102 and BSs 112, 114, 116, and 118 are communicating with each other using an Orthogonal Frequency Division Multiplexing (OFDM) and/or Orthogonal Frequency Division Multiple Access (OFDMA). In order to simplify the explanation, the MS 102 attempts initial access to the WiMAX system with the BS3 116 or BS4 118 so as to enter the WiMAX system via the BS3 116 or BS4 118. Here, the ASN composed of the BS3 116 and BS4 118 and ASN GW2 130 is referred to as anchor ASN which performs the initial network entry procedure with the MS 102. In this embodiment, it is also assumed that, after joining the anchor ASN, the MS 102 performs handover to the BS1 112 so as to receive the MCBCS via the ASN composed of the BS1 112, BS2 114, and ASN GW1 120. At this time, the ASN composed of the BS1 112, BS2 114, and ASN GW1 120 is called a serving ASN which is providing the MCBCS to the MS 102. That is, the ASN GW2 130 is the anchor ASN GW, and the ASN GW1 120 is the serving ASN GW. When the anchor ANS GW and the serving ASN GW differ from each other, the WiMAX system supports a session start, data path registration, and subscription procedures of the serving ASN.

The ASN GW1 120 includes a Data Path Function (DPF) module 122 for managing a data path of the serving ASN, a Proxy module 124 operating as a proxy of the serving ASN, and a Service Flow Authorization (SFA) module 126 for authorizing the MS 102 to receive an MCBCS flow provided via the serving ASN. The ASN GW 130 includes a DPF module 132 for managing a data path of the anchor ASN, a Proxy module 134 operating as a proxy of the anchor ASN, and a SFA module 136 for authorizing the MS 102 to receive an MCBCS flow provided via the anchor ASN. Here, the ASN GWs 120 and 130 are integrated into respective Access Control Routers (ACRs) that control the BSs 112, 114, 116, and 118.

The MCBCS server 140 includes a content server 142 for delivering a MCBCS content provided by the content provider 170 to the ASNs, and a controller 144 for controlling the MCBCS in order to provide the MS 102 with the MCBCS content delivered by the content server 142.

The AAA server 150 performs authentication, authorization, and accounting functions on the MS 102 and the content provider 170 under the support of the ASN GWs 120 and 130 and MCBCS server 140. The PF server 160 supports resource assignment and reservation in accordance with communication protocols associated with provision of the MCBCS. The content provider 170 creates MCBCS contents associated with various MCBCSs such as a location-based service, a video and audio service, Internet web service, a voice and video communication service; and transmits the MCBCS contents to the MCBCS server 140. With reference to the following tables, functions of the BSs 112, 114, 116, and 118 (i.e. RASs), ASN GWs 120 and 130 (ACRs), and MCBCS server 140 are described hereinafter in more detail.

As shown in table 1, the content server 142 of the MCBCS server 140 is an MCBCS content server which receives an MCBCS content from the content provider 170 and delivers the MCBCS content to the ASN GWs 120 and 130. For instance, the content server 142 can be a location server for providing location-based service, a video-on-demand/audio-on-demand (VoD/AoD) server for providing a Vod/AoD service, a web server for providing an Internet web service, and a VoIP/VT server for providing voice and video service. The content server 142 supports application layer security, e.g. Digital Rights Management (DRM), and performs function for merging MCBCS contents provided by different content providers. Also, the content server 142 performs function for organizing MCBCS programs and channels for providing the MCBCS to the MS 102.

The controller 144 of the MCBCS server 140 supports for assigning an Internet Protocol (IP) multicast address for multicasting the MCBCS content, IP multicast routing protocol and tunneling between ASN GW 120 and 130 and MCBCS server 140, and layer 2 security of the MCBCS content. The MCBCS content channel is identified by the IP multicast address which is identical with a Multicast Connection Identifier (MCID). The controller 144 performs also the management of ASNs joined a multicast group, authentication and authorization to the MCBCS subscriber (i.e. MS 102), supports for advertisement of the MCBCS provided by the MCBCS server 140, management of MCBCS sessions (e.g. session information assignment and start/end/update of session), and performs accounting on service.

TABLE 1

| Functional Entity | Detail Features | Remark |
| --- | --- | --- |
| MCBCS Content Server | Application layer security<br>Contents merging function from different content provider<br>MCBCS program and channel organization | DRM, etc |
| MCBCS controller | IP multicast address assignment<br>IP multicast routing protocol support for R3<br>R3 Tunneling support<br>Layer 2 security<br>Multicast group member management<br>MCBCS user authentication/authorization<br>Service advertisement<br>Session management<br><br>Accounting service | PIM-SM, PIM-SMv6<br><br><br><br><br><br><br><br>Session information assignment, Session Start/Stop/Update support |

Referring to table 2, the proxy modules 124 and 134 of the ASN GWs 120 and 130 perform interworking with the PF server 160 for MCBCS, management of Service Flow Identifier (SFID) for MCBCS, and assignment of static MCID and dynamic MCID for static and dynamic MCBCSs. The proxy modules 124 and 134 also support the Radio Resource Management (RRM) function for MCBCS and mapping function of transmission region to MBS zone. The proxy modules 124 and 134 also support the layer 2 security and static and dynamic air resource assignments for MCBCS contents. In order to support a macro diversity, the proxy modules 124 and 134 assigns the same air resource to all the BSs 112, 114, 116, and 118. The proxy modules 124 and 134 perform also MCBCS group member management, i.e. managing the MSs joined the MCBCS group, accounting service, time synch mechanism for supporting macro diversity, and MBS zone list management.

The DPF modules 122 and 132 of the ASN GWs 120 and 130 perform interworking with the PF server 160 for MCBCS, management of SFID for MCBCS, and support R3 tunneling and IP multicast routing protocols for connection among the ASNs, MCBCS server 140, AAA server 150, and PF server. The DPF modules 122 and 132 perform also MCBCS data classification, accounting service, and Internet Group Management Protocol (IGMP) proxy function. The DPF modules 122 and 132 also support static MCBCS data path registration/release between the ASN GWs 120 and 130 and the BSs 112, 114, 116, and 118 and dynamic MCBCS. Particularly, the DPF module 132 of the anchor ASN performs IGMP Report message transmission function.

The SFA modules 126 and 136 of the ASN GWs 120 and 130 determine, when received the MCBCS request from the MS 102, whether to permit or reject the MCBCS request based on the MS's Quality of Service (QoS) profile provided by the AAA server 150. The SFA modules 126 and 136 perform also admission control based on the resources available for providing the MCBCS by means of the local policy function modules (not shown) included in the SFA modules 126 and 136. That is, when the WiMAX system provides the MCBCS with static multicast service scheme, the SFA modules 126 and 136 determines whether to admit or reject the MCBCS request of the MS 102 based on the MS's QoS profile provided by the AAA server 150 at the initial network entry and provides, when the MCBCS request is admitted, the MS 102 with the MCBCS flow.

TABLE 2

| Functional entity | Detail Feature | Remark |
| --- | --- | --- |
| MCBCS proxy | PF interworking for MCBCS service<br>The management of SFID for MCBCS<br>Static MCID assignment<br>Dynamic MCID assignment<br>MCBCS RRM function<br>Mapping function of transmission region to MBS zone<br>Layer 2 security support<br>Static air resource assignment<br>Dynamic air resource assignment<br>MCBCS group member management<br>Accounting service<br>Time synch mechanism for macro diversity<br>MBS zone list management | <br><br><br><br><br><br><br>Symbol, subchannel, encoding rule, etc |
| MCBCS DPF | PF interworking for MCBCS service<br>The management of SFID for MCBCS<br>R3 tunneling support<br>IP multicast routing protocol for R3<br>MCBCS data classification<br>Accounting service<br>IGMP proxy function<br>Static R6 MCBCS data path registration/release<br><br>Dynamic R6 MCBCS | <br><br><br><br><br><br><br>Broadcast service, Static multicast service<br>Dynamic multicast service |
| DPF | IGMP Report message forwarding function | |
| Multicast Router | Functions defined by IETF | |

Referring to table 3, in order for the BSs 112, 114, 116, and 118, i.e. RASs for MBS data transmission on the MAC/PHY layers, to provide MCBCS to the MS 102; a MAC control module (not shown) of the RAS perform MBS zone support and MBS RRM function on the MAC layer; a MAC data module (not shown) supports the MBS MAP Information Element (MBS_MAP_IE), MBS_MAP, MBS_DATA_IE, and MCIDs on the MAC layer; and a PHY module supports MPS_MAP_IE, MBS_MAP, and MBS RRM Function on the PHY layer.

TABLE 3

| Functional Entity | Detail Features | Remark |
| --- | --- | --- |
| MAC(Control plane) | MBS zone support<br>MBS RRM Function<br>MBS_MAP_IE | |
| MAC(Data plane) | MBS_MAP<br>MBS_DATA_IE<br>Multicast CIDs | |
| PHY | MBS_MAP_IE<br>MBS RRM Function<br>MBS_MAP Synch | |

Referring to table 4, in order for the WiMAX system to provide the MCBCS using the multicast/broadcast service schemes, the MCBCS server 140 is configured such that its content server 142 supports MCBCS program (a group of MCBCS Content Channels) and Channel organization function, and the controller 144 supports IP multicast address assignment for providing MCBCS, IP multicast routing protocol and tunneling for connection between the ASNs and MCBCS server 140, advertisement of the MCBCSs provided by the MCBCS server 140, and session management for MCBCS. Here, the session management is performed per MCBCS content but not per MS. Also, the ASN GWs 120 and 130 are configured such that their proxy modules 124 and 134 support management of SFID for MCBCS, perform assignment of MCID and static air resource, control mapping function of transmission region to MBS zone and time synch mechanism for supporting macro diversity, and perform MBS zone list management; and DPF modules 122 and 132 support MCBCS data classification and static MCBCS data path registration/release between the ASN GWs 120 and 130 and BSs 112, 114, 116, and 118. In the meantime, the BSs 112, 114, 116, and 118 are configured such that the MAC control module supports MBS zone on the MAC layer; the MAC data module supports time sync mechanism for macro diversity, MBS_MAP_IE, MBS_MAP, MBS_DATA_IE, and MCIDs on the MAC layer; and the PHY module supports MBS_MAP_IE and MBS-MAP Synch on the PHY layer.

TABLE 4

| Network entity | Functional entity | Functions |
|---|---|---|
| MCBCS server | MCBCS content server | MCBCS program and channel organization |
| | MCBCS controller | IP multicast address assignment<br>IP multicast routing protocol support for R3<br>Service advertisement<br>Session management (Not per MS, but per MCBCS content) |
| ACR | MCBCS Proxy | Management of SFID for MCBCS<br>Static MCID, Air resource assignment by EMS<br>Mapping function of transmission region to MBS zone<br>Time sync mechanism for macro diversity<br>MBS zone list management |
| | MCBCS DPF | MCBCS data classification<br>Static MCBCS data path registration/release |
| RAS | MAC(control plane) | MBSMBS zone support |
| | MAC(data plane) | Time sync mechanism for macro diversity<br>MBS_MAP_IE<br>MBS_MAP<br>MBS_DATA_IE<br>Multicast CIDs |
| | PHY | MBS_MAP_IE<br>MBS_MAP Synch |

Referring to table 5, in order for the WiMAX system to provide the MCBCS in static multicast service scheme, the MCBCS server 140 is configured such that the content server 142 supports application layer security, and the controller 144 performs authentication/authorization, session management for MCBCS user, e.g. MS 102, and accounting for MCBCS. Also, the ASN GWs 120 and 130 are configured such that their proxy modules 124 and 134 perform assignment of static MCID and static air resource, the serving ASN's DPF module 122 performs IGMP proxy function, and the anchor ASN's DPF module 132 performs IGMP report message transmission function.

TABLE 5

| Network entity | Functional entity | Additional functions |
|---|---|---|
| MCBCS server | MCBCS content server | Application layer security |
| | MCBCS controller | MCBCS user authentication/authorization<br>Session management per MS<br>Accounting service |
| ACR | MCBCS proxy | Static MCID, Air resource assignment by MCBCS proxy<br>Accounting service |
| | MCBCS DPF | IGMP proxy function |
| | Anchor DPF | IGMP report message forwarding function |
| RAS | MAC | — |
| | PHY | — |

Referring to table 6, in order for the WiMAX system to provide the MCBCS in dynamic multicast service scheme, the MCBCS server 140 is configured such that the content server 142 performs contents merging function from different content providers, and the controller 144 supports layer 2 security and performs multicast group member (i.e. ASNs) management. Also, the ASN GWs 120 and 130 are configured such that their proxy modules 124 and 134 perform assignment of dynamic MCID and dynamic air resource, support layer 2 security, perform management of multicast group member (i.e. MSs joined the MCBCS group) and MCBCS RRM function and PF interworking for MCBCS; and their DPF modules 122 and 132 support dynamic MCBCS data path registration/release. In the meantime, the BSs 112, 114, 116, and 118 (i.e. RASs) support layer 2 security and MBS RRM function for the MCBCS contents on the MAC layer, and perform MBS RRM function on the PHY layer.

TABLE 6

| Network entity | Functional entity | Additional functions |
|---|---|---|
| MCBCS server | MCBCS content server | Contents merging function from different content provider |
| | MCBCS controller | Layer 2 security support multicast group member management |
| ACR | MCBCS proxy | Dynamic MCID, Air resource assignement by MCBCS proxy<br>Layer 2 security support multicast group member management<br>MCBCS RRM function<br>PF interworking for MCBCS service |
| | MCBCS DPF | Dynamic MCBCS data path registration/release |
| RAS | MAC | Layer 2 security support<br>MBS RRM function |
| | PHY | MBS RRM function |

The proxy modules 124 and 134 of the ASN GWs 120 and 130 control the MS 102 joining and leaving the anchor ASN or the serving ASN and MCBCS session bearer establishment, assign resources related to MCBCS (i.e. MCID), create MBS security keys for air interface encryption, support MCBCS charging, and maintain ASN GW list listing ASN GWs belonged to the MBS zone.

The DPF modules 122 and 132 of the ACRs supports MCBCS bearer establishment and release, joining and leaving MCBCS, MCBCS data transmission and classification, MCBCS charging, counting in order to dynamical bearer establishment and release, managing movement of the MS 102 in the MCBCS for the interface between the BSs (112, 114, 116, and 118 and the ASN GWs 120 and 130 and the interface among the ASN GWs 120 and 130 and MCBCS server 140, AAA server 150, and PF server 160, and multicast router function.

The content server 142 of the MCBCS server 140 receives MCBCS content from the content provider 170 and distributes the MCBCS content to the MS 102 through WiMAX network, repacks data from the content provider 170 for properly transporting in the WiMAX network, encrypts, when required, the MCBCS content on application layer, and transfers the MCBCS content in the format required by MCBCS session. The controller 144 of the MCBCS server 140 assigns IP multicast address, authenticates the content provider 170, controls the MCBCS content transport between the content server 142 and content provider 170 and MCBCS bearer establishment and release, generates and distributes MCBCS security key including MAK and application layer encryption key, decides and controls MCBCS session start and end, controls the MS 102 joining and leaving a certain MCBCS, authenticates and authorizes the MS 102 requesting for some MCBCS, maintains information about the MS 102 joined the MCBCS, collects accounting information and supports charging for the MS 102 and MCBCS provider and ASNs, decides which ASNs need to multicast/broadcast the MCBCS according to the MCBCS information, MCBCS subscriber profile (e.g. profile of the MS's owner) and the MCBCS proxy list and knowledge of whole MCBCS transmission zone configuration. The session start, data path registration, and subscription procedures for providing the MCBCS are described hereinafter.

Figure 2:
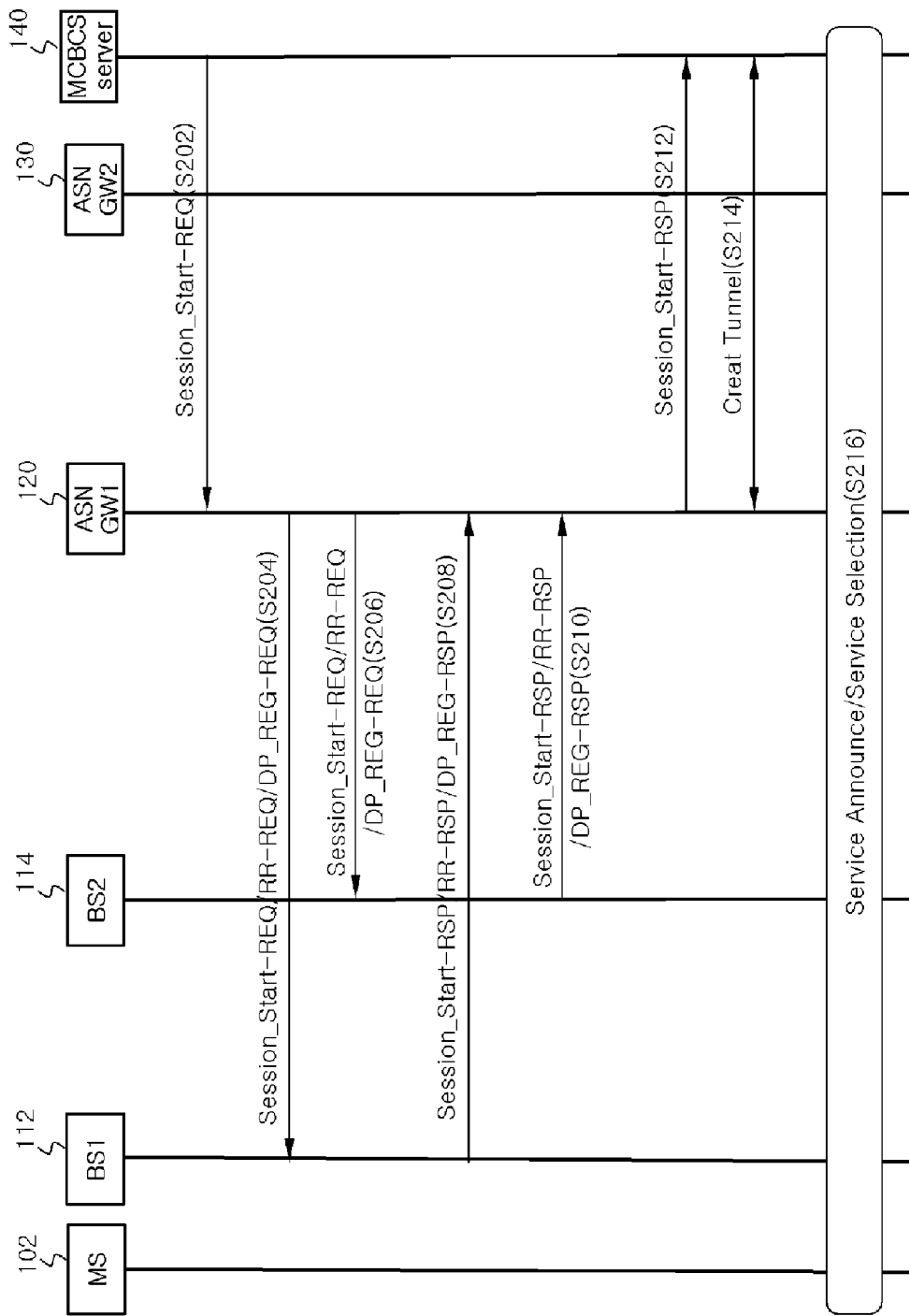
FIG. 2 is a signaling diagram illustrating a session start and data path registration procedure in serving ASN of a communication system according to an embodiment of the present invention.

FIG. 2 is a signaling diagram illustrating a session start and data path registration procedure in serving ASN of a communication system according to an embodiment of the present invention. Herein FIG. 2 shows a session start and data path registration procedure in different ASN, when the MS 102 entered the anchor ASN through an initial network entry procedure with the WiMAX system, and wants to be provided the MCBCS through the different ASN with the anchor ASN.

Referring to FIG. 2, if there is an MCBCS content corresponding to MCBCS to be provided to the MS 102 through the serving ASN, the MCBCS server 140 assigns IP multicast address to multicast content for session initiate, transmits a Session Start Request (Session_Start-REQ) message, including session information and QoS information corresponding to the MCBCS content, to the ASN GW1 120 of the serving ASN (S202).

Upon receipt of the Session_Start-REQ message, the ASN GW1 120 assigns an SFID, and transmits the Session_Start-REQ message to all BSs, i.e. BS1 112 and BS2 114, within the same MBS zone, which is provided same MCBCS, together with a Resource Reservation Request (RR-REQ) message or a Data Path Registration Request (DP_REG-REQ) message (S204 and S206). The BSs 112 and 114 each transmit same MCBCS data, and the RR-REQ message and DP_REG-REQ message can be transmitted by being piggybacked. At this time, a Generic Routing Encapsulation (GRE) tunnel is created per service flow of the BSs 112, 114. The GRE tunneling is created so that the same MCBCS data are transmitted to the MSs within the same MBS zone.

Herein, the Session_Start-REQ message transmitted by the ASN GW1 120 includes MCID, air resource parameters between the MS 102 and the BSs 112 and 114, and MAP information of MCBCS frame for providing MCBCS to the MS 102. The MAP information of the MCBCS frame is a MAP information of a MCBCS frame, transmitting the MCBCS data in MAC or PHY layers when the BSs 112 and 114 provide the MCBCS to the MS 102, and includes MBS burst frame offset, OFDMA symbol offset, subchannel offset, number of OFDMA symbols, number of subchannels, Repetition Coding Indication, next MBS frame offset, and next MBS OFDMA symbol offset. When the MCBCS data information to be transmitted within the serving ASN is received from the MCBCS server 140, the proxy module 124 of the ASN GW1 120 dynamically creates the MCID and resource parameter for the MCBCS. The MCID and resource parameters for the MCBCS also can be created by an Element Management System (EMS) of the WiMAX system and transmitted to the ASN GW1 120.

The RR-REQ message transmitted by the ASN GW1 120 includes the SFID, IP multicast address (e.g. MCID) for the BS1 112 and BS2 114, and parameters related to QoS. The DP_REG-REQ message includes information related to data tunnel and QoS information.

Upon receipt of the Session_Start-REQ/RR-REQ/DP_REG-REQ message, each of the BSs 112 and 114 performs resource reservation and data path registration, and then each transmits a Session_Start Response (Session_Start-RSP)/Resource Reservation Response (RR-RSP)/Data Path Registration Response (DP_REG-RSP) message to the ASN GW1 120 (S208 and S210).

If the Session_Start-RSP/RR-RSP/DP_REG-RSP message each is received, then the ASN GW1 120 transmits the Session_Start-RSP message to the MCBCS server 140 (S212).

Upon receipt of the Session_Start-RSP message, the MCBCS server 140 creates an R3 tunnel with the ASN GW1 120 for delivering the MCBCS content (S214). At this time, the R3 tunnel can be created according to the multicast routing protocol specified by the Internet Engineering Task Force (IETF). In this manner, the session start procedure among the serving ASN (including the ASN GW1 120 and BSs 112 and 114), the MCBCS server 160, and the MS 102 is successfully completed such that the data path is registered. After the data path registration has completed, a service announcement or service advertisement process is performed with a service selection process (S216).

As described above, in order to provide the MCBCS to the MS 102, the WiMAX system establishes a tunnel between the MS 102 and MCBCS server 140 by exchanging messages among the MCBCS server 140, ASN GW1 120 of the serving ASN, and BSs 112 and 114, the messages including Session_Start-REQ/RSP messages, RR-REQ/RSP messages, and DP_REG-REQ/RSP messages, thereby completing session start and data path registration and supporting to provide MCBCS to the MS 102.

Figure 3:
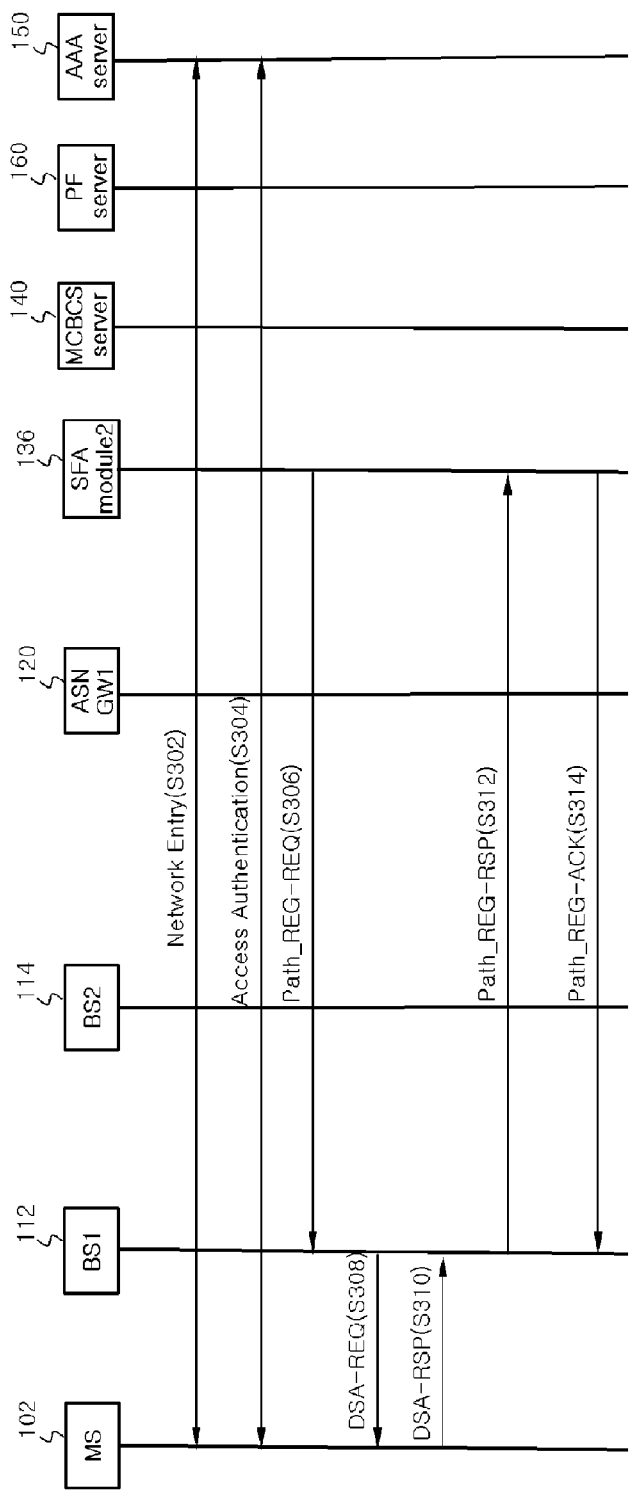
FIG. 3 is a signaling diagram illustrating a subscription procedure of a MS in a communication system to an embodiment of the present invention.

FIG. 3 is a signaling diagram illustrating a subscription procedure of a MS in a communication system to an embodiment of the present invention. Herein FIG. 3, shows a subscription procedure of MS thorough an ASN after completing the session start and data path registration procedure for providing the MCBCS as described in FIG. 2. When the MCBCS is provided with the multicast/broadcast scheme, the WiMAX system starts an activation procedure of service flow for providing the MCBCS in network non-related to an MCBCS provision request of the MS, in a case that the MS attempts to enter the network. That is, the WiMAX is that the MCBCS is activated at the network entry after the MS is successfully authenticated, but, the service flow of the MCBCS is not deactivated when the MSr does not want to provided the MCBCS.

Referring to FIG. 3, as described in FIG. 2, after the start of the session of the serving ASN, the data path registration, the service announcement and selection (S216), the MS 102 performs a network entry procedure to the AAA server 150 by initiate network entry (S302) and Access Authentication procedure with the AAA server 150 (S304). Next, the SFA module2 136 of the anchor ASN transmits the serving BS (BS1 112) a Path Registration Request (Path_REG-REQ) message including Service Flow Information of the MCBCS to be provided to the MS 102 and MCBCS data path information (S306). In order to simplify the explanation, it is assumed that the serving BS is BS1 112 among the BS1 112 and the BS2 114.

Upon receipt of the Path_REG-REQ message, the BS1 112 performs a Dynamic Service Addition (DSA) procedure with the MS 102. That is, the BS1 112 transmits the MS 102 a DSA Request (DSA-REQ) message (S308), and the MS 102 transmits the BS1 112 a DSA Response (DSA-RSP) message in response to the DSA-REQ message (S310). Here, the DSA procedure between the can be repeated more than once when the number of MCBCS data is greater than one, and the DSA-REQ message includes an MCID, an MBS zone ID, and a SFID.

After receiving the DSA-RSP message, the BS1 transmits a Path Registration Response (Path_REG-RSP) message including the service flow information according to the DSA procedure and path information on the MCBCS data (S312). Upon receipt of the Path_REG-RSP message, the SFA module2 136 transmits a Path Registration Acknowledgement (Path_REG-ACK) message to the BS1 112 in response to the Path_REG-RSP message (S314). Accordingly, the subscription of the MS 102 and service flow creation for the MCBCS to be provided through the serving ASN with which the data path is registered are completed. A procedure for providing MCBCS with static multicast service scheme is described hereinafter.

Figure 4:
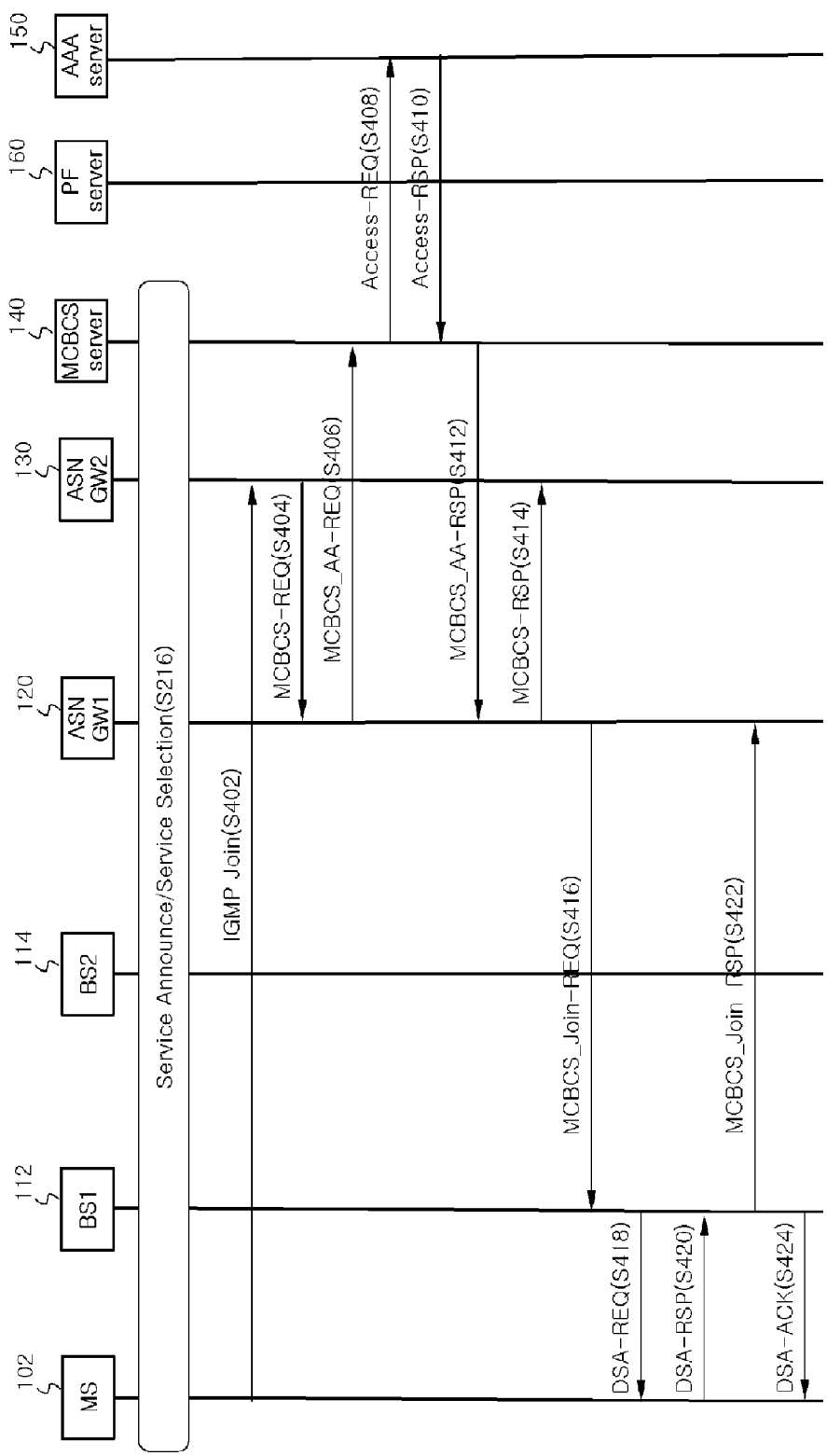
FIG. 4 is a signaling diagram illustrating an MCBCS join procedure in a communication system according to an embodiment of the present invention.

FIG. 4 is a signaling diagram illustrating an MCBCS join procedure in a communication system according to an embodiment of the present invention. FIG. 4 shows an MCBCS join procedure in a case in which an MS within the MBS zone is provided the MCBCS form the WiMAX system (e.g. the MS requests the WiMAX system for MCBCS join) with static multicast service scheme.

Referring to FIG. 4, as described in FIG. 2, after the MCBCS session between the serving ASN (i.e. the ASN GW1 120 and the BSs 112 and 114) and the MCBCS server 160 and the MS 102, has started, the data path has been registered, and the service announcement and service selection has been done (S216), the MS 102 transmits an join initiate message (e.g. IGMP Join message) to the ASN GW2 130 of the anchor ASN with which the MS 102 has performed the initial network entry in order to be provided the MCBCS from the WiMAX system providing the MCBCS with static multicast service scheme (S402). In the MCBCS join procedure for providing the MCBCS with static multicast service scheme, the IGMP join message can be received after the data path to provide the MCBCS has been established in the ASN of the MS 102. The IGMP join message includes an IP multicast address of the MCBCS content which is provided to the MS 102. In a case that the WiMAX system operates with IGMP version 3 (IGMPv3), the MS 102 transmits only one IGMP report message for joining multiple multicast groups. Otherwise, when the WiMAX system operates with IGMPv1 or IGMPv2, the MS 102 transmits multiple IGMP report messages of same number as one of MCBCS content channel. The multiple multicast groups are included in MCBCS program for providing the MCBCS.

Upon receipt the IGMP join message, the ASN GW2 130 transmits a MCBCS request (MCBCS-REQ) message as the IGMP join message to the ASN GW1 120 of the serving ASN by signaling (S404), such that the IGMP join message is delivered. The MCBCS-REQ message includes the BS identifiers (BSIDs) of the BSs transmitting the MCBCS data to the MS 102 and Network Access Information (NAI) for the serving ASN.

Upon receipt of the MCBCS-REQ message, the ASN GW1 120 transmits an MCBCS Authentication and Authorization Request (MCBCS_AA-REQ) message to the MCBCS server 140 for MCBCS authentication and authorization (S406). The MCBCS_AA-REQ message includes the IP multicast address and NAI. If the ASN GW1 120 has already acquired an MCBCS subscription profile of the MS 102, the ASN GW1 120 performs the authentication and authorization for the MS 102 by itself such that the MCBCS_AA-REQ message transmission to the MCBCS server 140 (S406) is skipped.

If the ASN GW1 120 had not acquired the MCBCS subscription profile of the MS 102 and transmitted the MCBCS_AA-REQ message to the MCBCS server 140, the MCBCS server 140 transmits an Access Request (Access-REQ) message to the AAA server 150 for authenticating and authorizing the MS 102 (S408). If the Access-REQ message is received, then the AAA server 150 performs authentication and authorization based on the profile of the MS 102, and transmits an Access Response (Access-RSP) message including the authentication and authorization result to the MCBCS server 140 (S410).

Upon receipt of the Access-RSP message, the MCBCS server 160 transmits an MCBCS Authentication and Authorization Response (MCBCS_AA-RSP) message including the authentication and authorization result to the ASN GW1 120 (S412). As aforementioned, if the ASN GW1 120 has already acquired the MCBCS subscription profile of the MS 102, the MCBCS_AA-REQ/RSP message exchange (S408 and S410) is skipped.

If the MCBCS_AA-RSP message is received, then the ASN GW1 120 transmits an MCBCS Response (MCBCS-RSP) message to the ASN GW2 130 in response to the MCBCS-REQ message (S414). And the ASN GW1 120 transmits to the serving BS (e.g. BS1 112) an MCBCS Join Request (MCBCS_Join-REQ) message including the MCID corresponding to the MCBCS to be provided to the MS 102, SFID, and IP multicast address (S416). In this embodiment, it is assumed that, among the BS1 112 and the BS2 114, the BS1 112 is the serving BS to the MS 102.

Upon receipt of the MCBCS_Join-REQ message, the BS1 112 performs a Dynamic Service Addition (DSA) procedure with the MS 102. That is, the BS1 112 transmits a DSA Request (DSA-REQ) message to the MS 102 (S418), and the MS 102 transmits a DSA Response (DSA-RSP) message to the BS1 112 in response to the DSA-REQ message (S420). The DSA-REQ message includes the MCID, MCBCS Content ID, and MBS zone ID corresponding to the MS 102 and the MCBCS be provided to the MS.

If the DSA-RSP message is received, then the BS1 112 transmits the ASN GW1 120 a MCBCS Join Response (MCBCS_Join-RSP) message including result of which the DSA procedure is successfully performed (S422). Upon receipt of the MCBCS_Join-RSP message, the ASN GW1 120 determines that the MCBCS join procedure of the MS 102 is successfully performed to the serving ASN, and recognizes that a provision of the MCBCS is available for the MS 102 according to a success of which the MCBCS join procedure. Also, the BS1 112 transmits a DSA Acknowledgement (DSA-ACK) message to the MS 102 in response to the DSA-RSP message (S424). Upon receiving the MCBCS_Join-RSP message and being successfully performed the MCBCS join procedure of the MS 102, the ASN GW1 120 updates MCBCS context which is related to the MCBCS.

In this manner, if the MS 102 being provided the MCBCS transmits the IGMP Join message to the anchor ASN for joining the MCBCS to be provided the MCBCS, the anchor ASN requests the serving ASN for the MS's MCBCS join, and the serving ASN (i.e. the ASN GW1 120, BS1 112), and MCBCS server 140 support the MCBCS join of the MS 102 and provide the MCBCS with static multicast service scheme.

Figure 5:
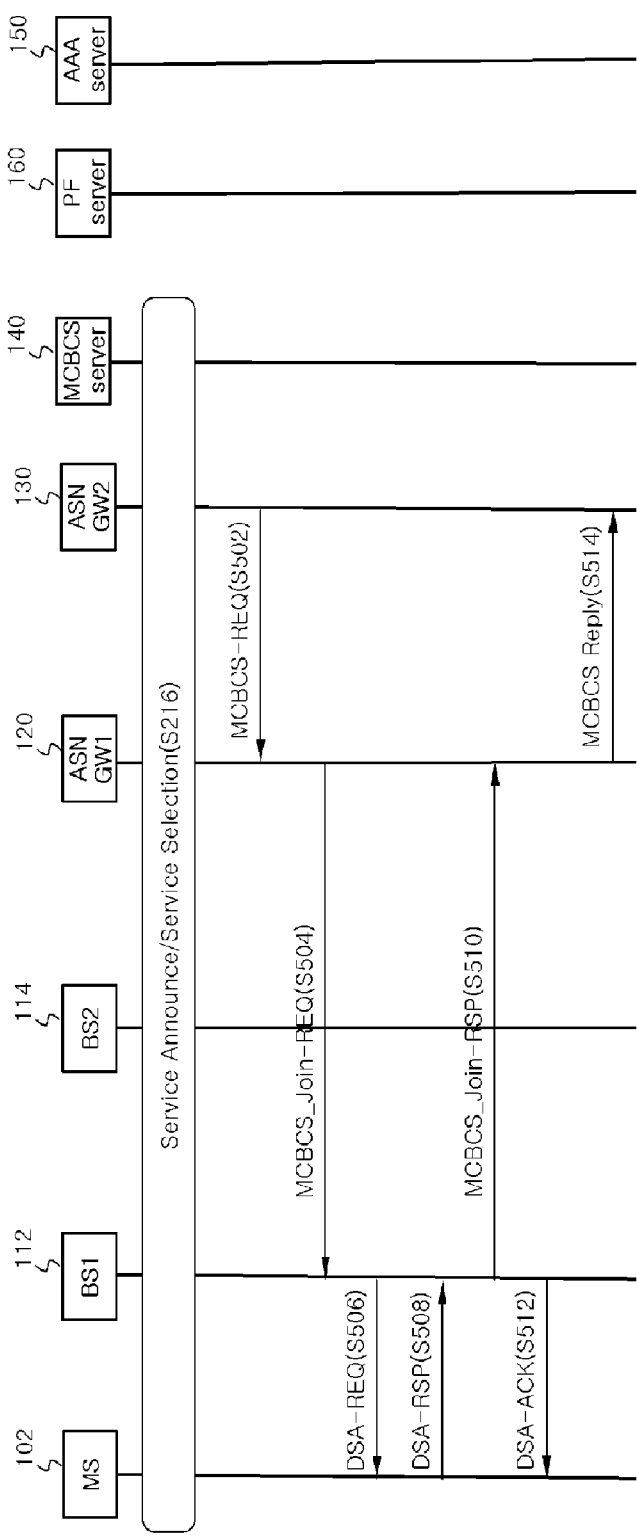
FIG. 5 is a signaling diagram illustrating an MCBCS join procedure in a communication system according to another embodiment of the present invention.

FIG. 5 is a signaling diagram illustrating an MCBCS join procedure in a communication system according to another embodiment of the present invention. FIG. 5 shows an MCBCS join procedure in a case in which the WiMAX system provide the MCBCS to the MBS zone with static multicast service scheme non-related to the MCBCS join request of the MS (e.g. anchor ASN requests the MCBCS join for the MS) in the WiMAX system providing the MCBCS with static multicast service scheme.

Referring to FIG. 5, as described in FIG. 2, after the MCBCS session between the serving ASN (i.e. the ASN GW1 120 and the BSs 112 and 114) and the MCBCS server 160 and the MS 102, has started, the data path has been registered, and the service announcement and service selection has been done (S216), when MCBCS data is existed in the MBS zone with multicast in the MBS zone, the ASN GW2 130 of the anchor ASN for the MS 102 transmits an MCBCS-REQ message to the ASN GW1 120 of the serving ASN so that the MCBCS join procedure is initiated for the MS 102 (S502). The ASN GW2 130 transmits the MCBCS-REQ message by signaling, the MCBCS-REQ message includes the BSIDs of the BSs that are multicasting the MCBCS data to the MS 102 and the NAI of the serving ASN.

Upon receipt of the MCBCS-REQ message, the ASN GW1 120 transmits the serving BS (BS1 112) an MCBCS_Join-REQ message including an MCID, SFID, and IP multicast address corresponding to the MS 102 and the MCBCS to be provided to the MS 102 (S504). In this embodiment, it is assumed that, among the BS1 112 and BS2, the BS1 112 is the serving BS to the MS 102.

If the MCBCS_Join-REQ message is received, the BS1 112 performs a DSA procedure with the MS 102. That is, the BS1 112 transmits a DSA-REQ message to the MS 102 (S506), and the MS 102 transmits a DSA-RSP message to the BS1 112 in response to the DSA-REQ message (S508). The DSA-REQ message includes the MCID, MCBCS Content ID, and MBS zone ID corresponding to the MS 102 and the MCBCS to be provided to the MS 102.

Upon receipt of the DSA-RSP message, the BS1 112 transmits the ASN GW1 120 an MCBCS_Join-RSP message including result of which the DSA procedure is successfully performed (S510), and transmits a DSA-ACK message to the MS 102 in response to the DSA-RSP message (S512). If the MCBCS_Join-RSP message received, then the ASN GW1 120 transmits the ASN GW2 130 of the anchor ASN an MCBCS Replay message including result of which the MCBCS join procedure of the MS 102 is successfully performed to provide the MCBCS with static multicast service scheme in response to the MCBCS-REQ message (S514). Upon receipt of the MCBCS_Join-RSP message, the ASN GW1 120 recognizes that a provision of the MCBCS is available for the MS 102 according to a success of which the MCBCS join procedure of the MS 102 is performed to the serving ASN. The ASN GW1 120 received the MCBCS_Join-RSP updates the MCBCS context related to the MCBCS according to a success of which the MCBCS join procedure of the MS 102 is performed, i.e. receipt of the MCBCS_Join-RSP message.

As aforementioned, in the WiMAX system, when the MCBCS is existed to be provided to the MBS zone non-related to the MCBCS join request of the MS 102, the anchor ASN requests the serving ASN for the MCBCS join of the MS 102, and the serving ASN (i.e. the ASN GW1 120, BS1 112) and MCBCS server 140 support the MCBCS join of the MS 102, such that the WiMAX provides the MCBCS with static multicast service scheme.

Figure 6:
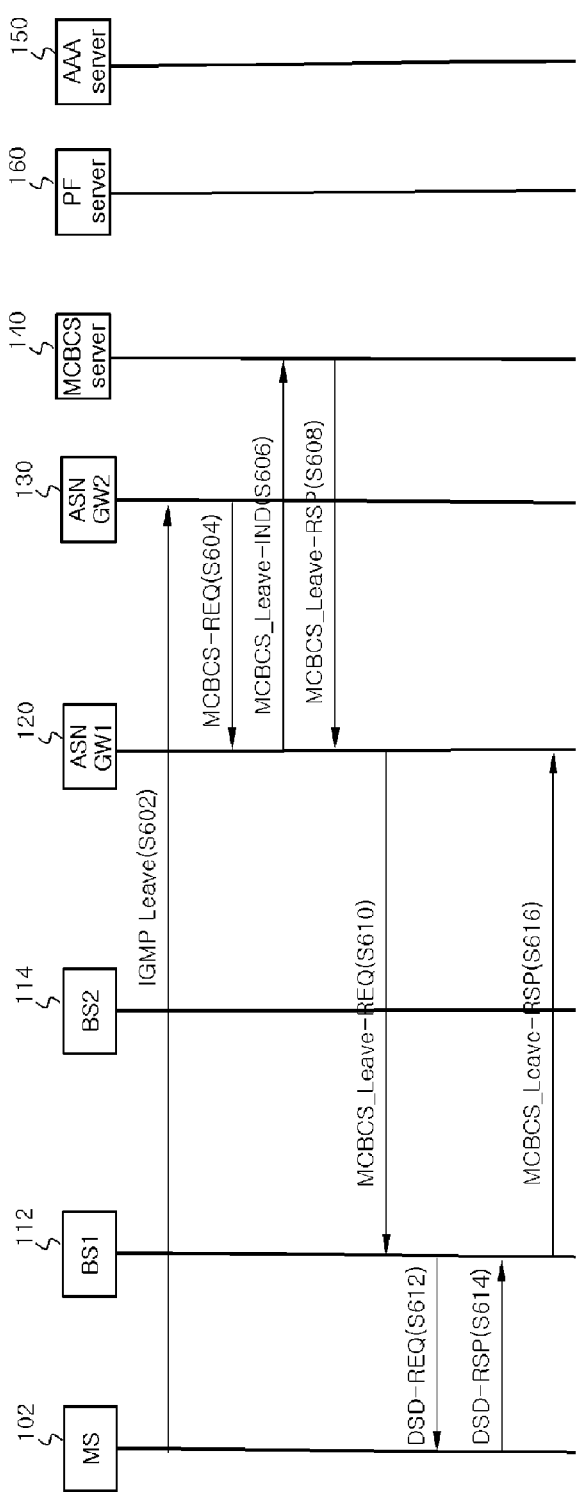
FIG. 6 is a signaling diagram illustrating an MCBCS leave procedure in a communication system according to an embodiment of the present invention.

FIG. 6 is a signaling diagram illustrating an MCBCS leave procedure in a communication system according to an embodiment of the present invention. FIG. 6 shows an MCBCS leave procedure in a case in which the MS, which having been provided the MCBCS by performing the MCBCS join procedure with the WiMAX system providing the MCBCS with static multicast service scheme as described in FIG. 4, does not want to be provided the MCBCS form the WiMAX (e.g. the MS requests an MCBCS leave).

Referring to FIG. 6, when the MS 102, which having been provided the MCBCS from the WiMAX system with static multicast service scheme by performing the MCBCS join procedure with the WiMAX system as described in FIG. 4, does not want to be provided the MCBCS, the MS 102 transmits an IGMP Leave message to the anchor ASN GW2 130, with which the MS 102 performs initial network entry, in order to perform an MCBCS leave procedure (S602). At this time, the MS 102 transmits the IGMP leave message using an Initial Service Flow (ISF) or pre-provisioned service flow for leaving specific multicast service indicated by the IP multicast address. That is, MS 102 transmits the IGMP leave message including the IP multicast address of the MCBCS content wanted to leave the MCBCS (i.e. stop providing the MCBCS) for leaving the MCBCS with the serving ASN.

Upon receipt of the IGMP leave message, the ASN GW2 130 transmits an MCBCS-REQ message to the ASN GW1 120 of the serving ASN (S604) by signaling. That is, the IGMP Leave message is encapsulated in an MCBCS-REQ message. The MCBCS-REQ message includes BSIDs of the BSs transmitting the MCBCS data to the MS 102, an NAI of the serving ASN and the IGMP Leave message.

Upon receipt of the MCBCS-REQ message, the ASN GW1 120 transmits to the MCBCS server 140 an MCBCS_Leave Indication (MCBCS_Leave_IND) message including signature of the MS 102 for MCBCS authentication consideration (S606). If the MCBCS_Leave_IND message is received, then the MCBCS server 140 transmits an MCBCS Leave Response (MCBCS_Leave-RSP) message to the ASN GW1 120 with verification and in response to the MCBCS_Leave_IND message (S608). The MCBCS_Leave-RSP message includes the NAI to the serving ASN of the MS 102 and the MCBCS indicator or MCBCS ID. The MCBCS server stops updating the MCBCS related to context.

Upon receipt of the MCBCS_Leave-RSP message, the ASN GW1 120 transmits an MCBCS Leave Request (MCBCS_Leave-REQ) message to the serving BS of the MS 102 (e.g. BS1 112) (S610). In this embodiment, it is assumed that, among the BS1 112 and BS2 114, the BS1 112 is the serving BS of the MS 102. The MCBCS_Leave-REQ message can reuse the RR-REQ message used in the session start and data path registration procedure as depicted in FIG. 2. The MCBCS_Leave-REQ message includes the MCBCS indicator of the MCBCS to leave, corresponding SFID, and MCID.

Upon receipt of the MCBCS_Leave-REQ message, the BS1 112 performs a Dynamic Service Deletion (DSD) procedure with the MS 102. That is, the BS1 112 transmits a DSD Request (DSD-REQ) message to the MS 102 (S612), and the MS 102 transmits a DSD Response (DSD-RSP) message to the BS1 112 in response to the DSD-REQ message (S614).

The DSD-REQ message instructs the MS 102 to release the radio resource of MCBCS traffic corresponding to the MCBCS to leave.

Upon receipt of the DSD-RSP message, the BS1 112 releases, if the MS1 102 is the last MS receiving the MCBCS traffic, the radio resource corresponding to the MCBCS traffic, and transmits the ASN GW1 120 an MCBCS Leave Response (MCBCS_Leave-RSP) message including the resource lease result (S616). Consequently, the ASN GW1 120 received the MCBCS_Leave-RSP message completes the MCBCS leave procedure by deleting all contexts related to the MS 102, and releases connection with the MS 102. That is, the ASN GW1 120 deletes all contexts related to the MS 102 by receiving the MCBCS_Leave-RSP) message.

Figure 7:
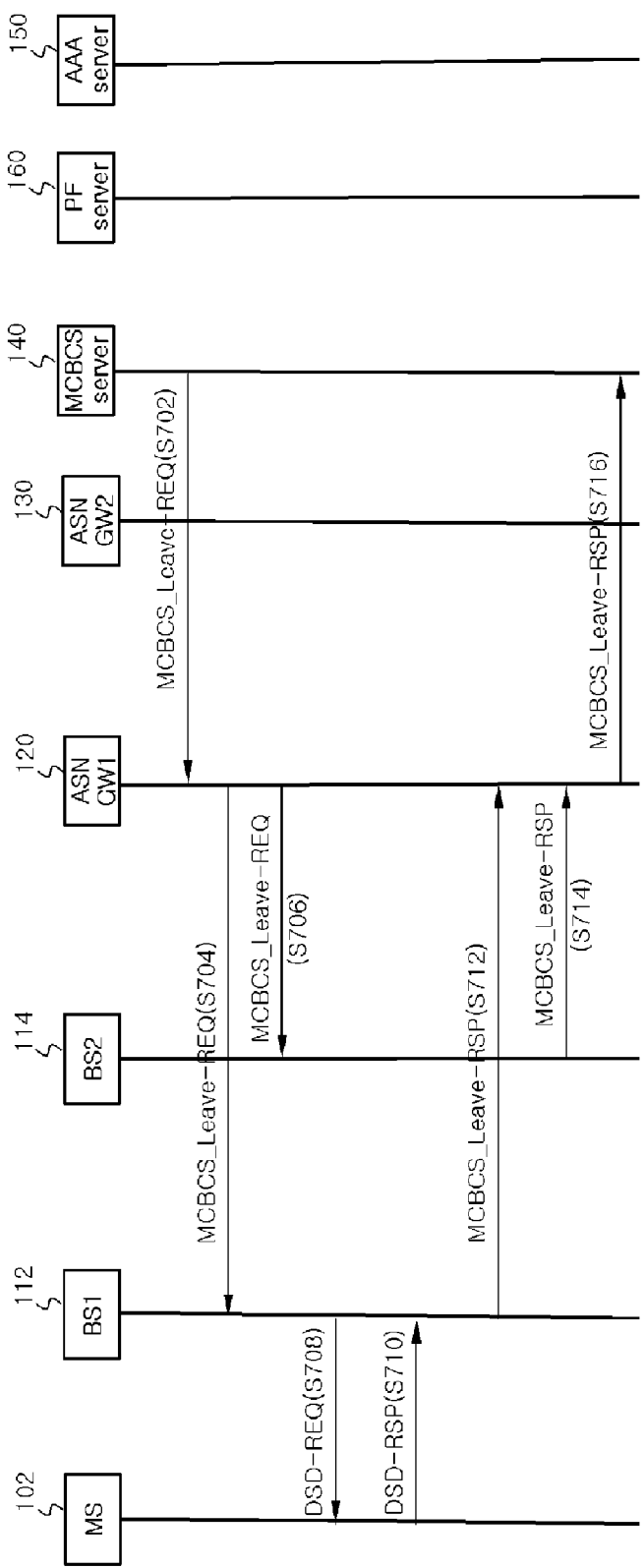
FIG. 7 is a signaling diagram illustrating an MCBCS leave procedure in a communication system according to another embodiment of the present invention.

FIG. 7 is a signaling diagram illustrating an MCBCS leave procedure in a communication system according to another embodiment of the present invention. FIG. 7 shows an MCBCS leave procedure in a case in which the WiMAX system having provided the MCBCS with static multicast service scheme as depicted in FIG. 5, the MCBCS is not existed to be provided by the WiMAX system (e.g. the MCBCS server requests an MCBCS leave).

Referring to FIG. 7, when MCBCS data is not existed to be provide to MBS zone by the WiMAX system, which having provided the MCBCS with static multicast service scheme by performing the MCBCS join procedure with the MS 102 as depicted in FIG. 5, the MCBCS server 140 transmits an MCBCS_Leave-REQ message to the ASN GW1 120 of the serving ASN (S702). Upon receipt of the MCBCS_Leave-REQ message, the ASN GW1 120 transmits the MCBCS_Leave-REQ message to all BSs (i.e. the BS1 112 and BS2 114) within the MBS zone defined by the MCBCS server 140 (S704 and S706).

Upon receipt of the MCBCS_Leave-REQ) message, each of the BSs 112 and 114 performs a DSD procedure with all MSs within the MBS zone. That is, the serving BS (i.e. BS1 112) of the MS 102 transmits a DSD-REQ message to the MS 102 (S708), and the MS 102 transmits a DSD-RSP message to the BS1 112 in response to the DSD-REQ message (S710). In this embodiment, it is assumed that, among the BS1 112 and the BS2 114, the BS1 112 is the serving BS of the MS 102. The DSD-REQ message instructs the MS 102 to release the radio resource of MCBCS traffic corresponding to the MCBCS to leave. Upon receipt of the DSD-RSP message, each of the BS1 112 and BS114 releases the radio resource corresponding to the MCBCS traffic, if the MS performed the DSD procedure is the last MS receiving the MCBCS traffic (particularly, the BS1 112 releases the radio resource corresponding to the MCBCS traffic receiving from the MS 102), and transmits an MCBCS_Leave-RSP message including the radio resource release result to the ASN GW1 120 (S712 and S714).

Upon receipt of the MCBCS_Leave-RSP message, the ASN GW1 120 deletes all contexts related to the MS 102. The ASN GW1 120 also transmits the MCBCS_Leave-RSP message to the MCBCS server 140 in response to the MCBCS_Leave-REQ message (S716). The MCBCS server 140 received the MCBCS_Leave-RSP message deletes the MS information mapped by IP multicast address. A method for providing MCBCS with dynamic multicast service scheme is described hereinafter.

Figure 8:
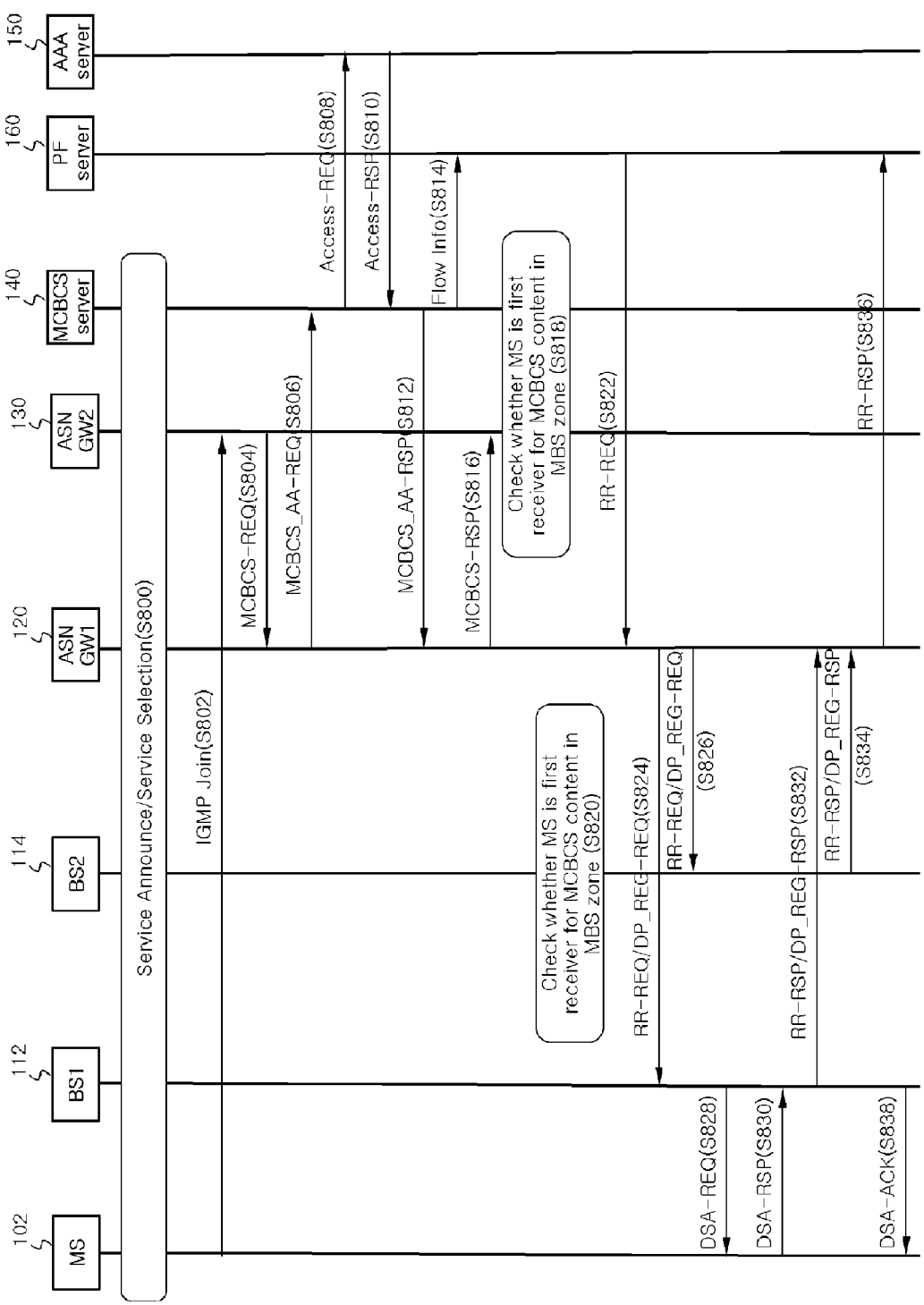
FIG. 8 is a signaling diagram illustrating an MCBCS join procedure in a communication system according to another embodiment of the present invention.

FIG. 8 is a signaling diagram illustrating an MCBCS join procedure in a communication system according to another embodiment of the present invention. FIG. 8 shows an MCBCS join procedure in a case in which an MS within an MBS zone want to provide MCBCS form the WiMAX system, which provides the MCBCS with dynamic multicast service scheme based on communication environment, e.g. whether MS exist within the MCBCS zone (MS requests MCBCS join).

Referring to FIG. 8, after the service announcement and service selection procedure has successfully completed (S800), the MS 102 transmits an IGMP Join message to the ASN GW2 130 of anchor ASN, with which the MS 102 has performed the initial network entry in order to be provided the MCBCS from the WiMAX system providing the MCBCS with dynamic multicast service scheme (S802). Although the service announcement and service selection procedure has performed, the session start and data path registration procedures are not performed among the serving ASN (including the ASN GW1 120 and BSs 112 and 114), the MCBCS server 160, and the MS 102 yet described in FIG. 2, but performed with the MCBCS join procedure. That is, static MCBCS join procedure is performed after the session starts and the data path is registered in MCBCS join with static multicast service scheme as depicted in FIG. 4, but in MCBCS join with dynamic multicast service scheme, the session start and data path registration is performed with the MCBCS join procedure.

The IGMP Join message includes the IP multicast address of the MCBCS content wanted to provide by the MS 102. In a cast that the WiMAX system operates with IGMPv3, the MS 102 transmits only one IGMP report message for joining multiple multicast groups. Otherwise, when the WiMAX system operates with IGMPv1 or IGMPv2, the MS 102 transmits multiple IGMP report messages of same number as one of MCBCS content channel.

Upon receipt of the IGMP Join message, the ASN GW2 130 transmits a MCBCS-REQ message as the IGMP Join message to the ASN GW1 120 (S804) by signaling. The MCBCS-REQ message includes the BSIDs of the BSs transmitting the MCBCS data to the MS 102, and NAI of the serving ASN.

Upon receipt of the MCBCS-REQ message, the ASN GW1 120 transmits an MCBCS_AA-REQ message to the MCBCS server 140 for MCBCS authentication and authorization (S806). The MCBCS_AA-REQ message includes the IP multicast address and NAI. If the ASN GW1 120 has already acquired an MCBCS subscription profile of the MS 102, the ASN GW1 120 performs the authentication and authorization to the MS 102 by itself such that the MCBCS_AA-REQ message transmission (S806) is skipped.

If the ASN GW1 120 had not acquired the MCBCS subscription profile of the MS 102 and transmitted the MCBCS_AA-REQ message to the MCBCS server 140, the MCBCS server transmits an Access-REQ message to the AAA server 150 for authentication and authorization to the MS 102 (S808). Upon receipt of the Access-REQ message, the AAA server 150 performs authentication and authorization using profile of the MS 102, and transmits the MCBCS server 140 an Access-RSP message including the authentication and authorization result (S801).

Upon receipt of the Access-RSP message, the MCBCS server 140 transmits the ASN GW1 120 an MCBCS_AA-RSP message including the authentication and authorization result (S812). Here, the MCBCS server 140 recognizes, on the basis of the authentication and authorization result, that a receiver exists to receive the MCBCS within the MBS zone, transmits a PF server 160 a Flow Info message including multicast IP, source IP and port, MCID, etc. (S814). The MCBCS server 140 may recognize that the MS 102 is the first receiver to receive the MCBCS within the MBS zone based on the authentication and authorization result. As aforementioned, when the ASN GW1 120 has already acquired the MCBCS subscription profile of the MS 102, the MCBCS_AA-REQ/RSP message exchange (S806 and S812), the Access-REQ/RSP message exchange (S808 and S81), and the Flow Info transmission (S814) are skipped.

Upon receipt of the MCBCS_AA-RSP message, the ASN GW1 120 transmits an MCBCS-RSP message to the ASN GW2 130 in response to the MCBCS-REQ message (S816). Once the MCBCS-RSP message is received, the ASN GW2 of the anchor ASN and the MCBCS server 140 checks that the MS 102 is the first receiver to receive the MCBCS content through serving ASN within the MBS zone, i.e. the anchor ASN and the MCBCS server 140 checks that the MS 102 is the first receiver for the MCBCS content within the MBS zone (S818). As aforementioned, the MCBCS server 140, which provides the MCBCS with dynamic multicast service scheme, checks that the MS 102 is the first receiver to receive the MCBCS within the MBS zone defined by itself. Also, the BS (BS2 114) belonged to the same MBS zone with the serving BS (i.e. BS1 112) checks that the MS 102 is the first receiver to provide the MCBCS within the MBS zone, for macro diversity of the MCBCS provided to the same MBS zone (S820). That is, the BS2 114 checks that the MS 102 is the first receiver to receive the MCBCS within the MBS. In this embodiment, it is assumed that, among the BS1 112 and the BS2 114, the BS1 112 is the serving BS of the MS 102.

The PF server 160 received the Flow Info message transmits an RR-REQ message to the ASN GW1 120 for reservation of resources required among the serving ASN, MCBCS server 140, AAA server 150, and PF server 160 in order to provide the MCBCS being requested by MS 102 (S822). Upon receipt of the RR-REQ message, the ASN GW1 120 assigns an SFID to be provided the MCBCS by the MCBCS server 140 (i.e. to transmit the MCBCS content to the MS 102 as the first receiver), and transmits the RR-REQ message including the SFID, MCID, and IP multicast address to the BS1 112 together with a DP_REG-REQ message (S824). At this time, the RR-REQ message and DP_REG-REQ message are also transmitted to the BS2 114 for macro diversity. Here, the RR-REQ message and DP_REG-REQ message are used for session start and data path registration with the RR-RSP message and DP_REG-REQ message to be explained later. That is, the RR-REQ message and DP_REG-REQ message are transmitted for the data path registration and MCBCS join of the MS 102 and the RS-RSP message and data path registration and success of MCBCS join for MCBCS is recognized by the DP_REG-RSP message.

Upon receipt of the RR-REQ/DP_REG-REQ messages, the BS1 112 performs a DSA procedure with the MS 102. That is, the BS1 112 transmits a DSA-REQ message to the MS 102 (S828), and the MS 102 transmits a DSA-RSP message to the BS1 112 in response to the DSA-REQ message (S830). The DSA-REQ message includes the MCID, MCBCS content ID, and MBS zone ID corresponding to the MCBCS to be provided to the MS 102.

Upon receipt of the DSA-RSP message, the BS1 112 transmits the ASN GW1 the RR-RSP and DP_REG-RSP messages including result of which the DSA procedure is successfully performed, i.e. result of resource reservation and data path registration between the BS1 112 and the MS 102 to provide the MCBCS requested by the MS 102 (S832). Meanwhile, the BS2 114 received the RR-REQ message and DP_REG-RSP message performs a resource and registers a data path so that the MCBCS content is transmitted for the macro diversity, and transmits the RR-RSP and DP_REG-RSP messages including result of the resource reservation and data path registration (S384).

Upon receipt of the RR-RSP and DP_REG-RSP messages, the ASN GW1 120 transmits the RR-RSP message to the PF server 160 in response to the RR-REQ message (S836). In the meantime, after transmitting the RR-RSP/DP_REG-RSP messages, the BS1 112 transmits a DSA-ACK message to the MS 102 in response to the DSA-RSP message (S838). Consequently, the ASN GW1 120 starts a session among the serving ASN (including the ASN GW1 120 and BSs 112 and 114), the MCBCS server 160, and the MS 102, registers the data path, and recognizes the MCBCS join of the MS 102. Here, the ASN GW1 120 received the RR-RSP and DP_REG-RSP messages recognizes that the session start and data path registration and MS's MCBCS join procedures are successfully performed, and that a provision of the MCBCS is available for the MS 102, and updates the MCBCS context related to the MS 102, i.e. the MCBCS context related to the MCBCS by receiving the RR-RSP and DP_REG-RSP message.

As described above, in the WiMAX system, the MS 102, which wants to be provided the MCBCS, transmits an IGMP join message to anchor ASN for MCBCS join in order to be provided the MCBCS, and the anchor ASN requests the serving ASN for the MCBCS join of the MS 102, the serving ASN (i.e. the ASN GW1 120, BS1 112), and MCBCS server 140 support the MCBCS join of the MS 102, and provide the MCBCS with dynamic multicast service scheme.

The MCBCS join procedure, to which the WiMAX system provides the MCBCS non-related to the MCBCS join request of the MS in the WiMAX system providing the MCBCS with dynamic multicast service scheme, in a communication system according to another embodiment of the present invention is performed in the same manner as the MCBCS join procedure, to which the WiMAX system provides the MCBCS non-related to the MCBCS join request of the MS in the WiMAX system providing the MCBCS with static multicast service scheme described in FIG. 5. Accordingly, the MCBCS join procedure in which the WiMAX system, providing the MCBCS with the dynamic multicast service scheme, provides the MCBCS to MBS zone (e.g. anchor ASN) is performed same procedure in which the WiMAX system, providing the MCBCS with static multicast service scheme described in FIG. 5, detailed description about it is omitted.

Figure 9:
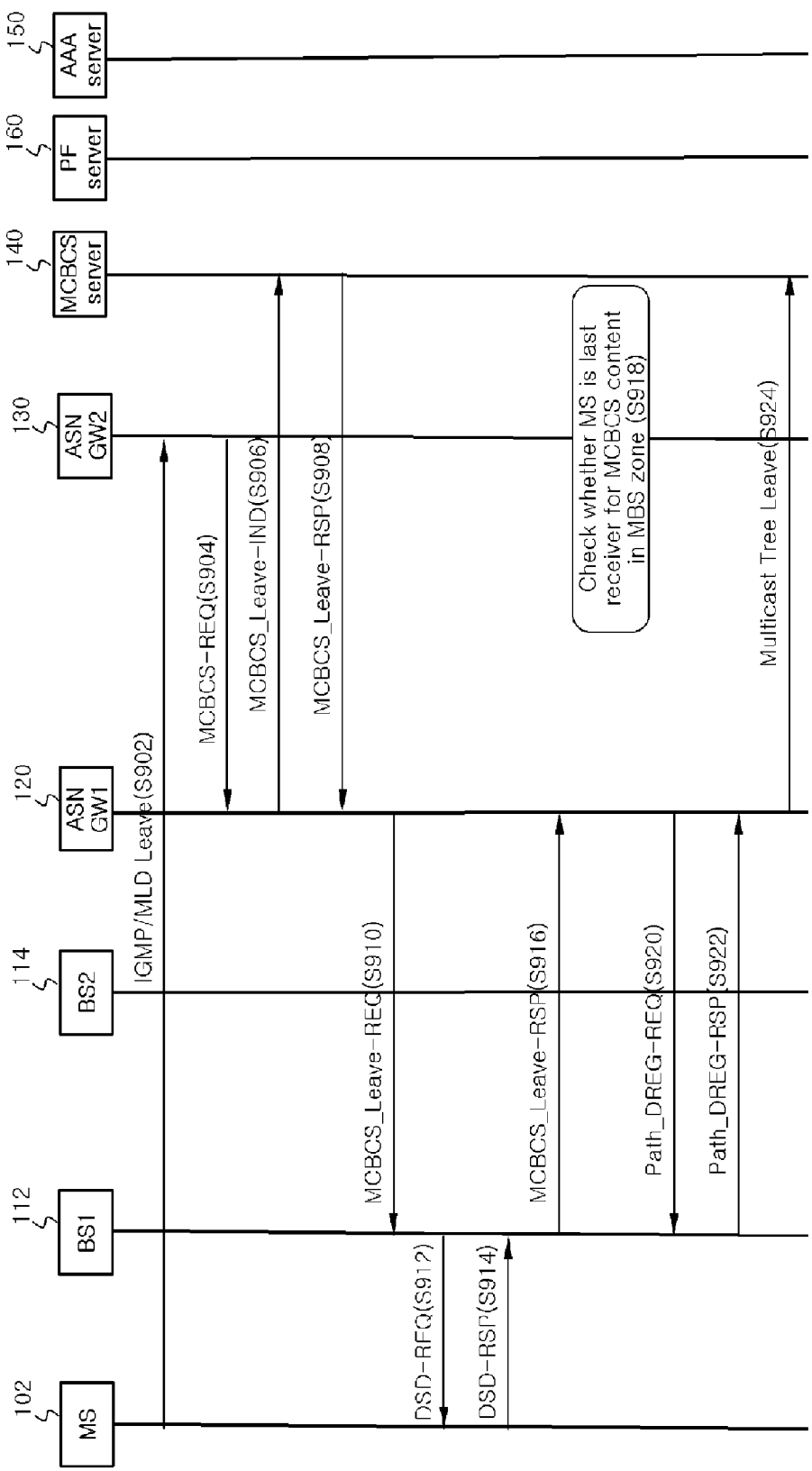
FIG. 9 is a signaling diagram illustrating an MCBCS leave procedure in a communication system according to another embodiment of the present invention.

FIG. 9 is a signaling diagram illustrating an MCBCS leave procedure in a communication system according to another embodiment of the present invention. FIG. 9 shows an MCBCS leave procedure in a case in which the MS, which having been provided the MCBCS by performing the MCBCS join procedure with the WiMAX system providing the MCBCS with dynamic multicast service scheme as described in FIG. 8, does not want to be provided the MCBCS form the WiMAX (e.g. the MS requests an MCBCS leave).

Referring to FIG. 9, when the MS 102, which having been provided the MCBCS from the WiMAX system with dynamic multicast service scheme by performing the MCBCS join procedure with the WiMAX system as described in FIG. 8, does not want to be provided the MCBCS, the MS 102 transmits the ASN GW2 130 of its anchor ASN an IGMP Leave message, or a multicast group management protocol message (e.g. Multicast Listener Discovery Leave (MLD Leave) message) in order to perform the MCBCS Leave procedure (S902). At this time, the IGMP Leave message is transmitted using the ISF or pre-provisioned service flow to release a specific multicast service indicated by the IP multicast address. That is, the MS 102 transmits the IGMP leave message including the IP multicast address of the MCBCS content be wanted to stop providing the MCBCS to MCBCS leave with the serving ASN.

Upon receipt of the IGMP Leave message, the ASN GW2 130 transmits an MCBCS-REQ message as the IGMP Leave message to the ASN GW1 120 of the serving ASN by signaling (S904). The MCBCS-REQ message includes BSIDs of the BSs transmitting MCBCS data to the MS 102, NAI of serving ASN of the MS 102, and the IGMP Leave message.

Upon receipt of the MCBCS-REQ message, the ASN GW1 120 transmits the MCBCS server 140 an MCBCS_Leave_IND message including signature of the MS 102 for MCBCS authentication consideration (S906). Upon receipt of the MCBCS_Leave_IND message, the MCBCS server 140 transmits an MCBCS_Leave-RSP message to the ASN GW1 120 with verification and in response to the MCBCS_Leave_IND message (S908). The MCBCS_Leave-RSP message includes the NAI to the serving ASN of the MS 102, MCBCS indicator or MCBCS ID. The MCBCS server 140 stop updating the MCBCS related content.

Upon receipt of the MCBCS_Leave-RSP message, the ASN GW1 120 transmits an MCBCS_Leave-REQ message to the serving BS (i.e. BS1 112) (S910). In this embodiment, it is assumed that, among the BS1 112 and BS2 114, the BS1 112 is the serving BS of the MS 102. The MCBCS_Leave-REQ message can reuse the RR-REQ message used in the session start and data path registration procedure. The MCBCS_Leave-REQ message includes the MCBCS indicator of the MCBCS to leave, corresponding SFID, and MCID.

Upon receipt of the MCBCS_Leave-REQ message, the BS1 112 performs a DSD procedure with the MS 102. That is, the BS1 112 transmits a DSD-REQ message to the MS 102 (S912), and the MS 102 transmits a DSD-RSP message to the BS1 112 in response to the DSD-REQ message (S914). The DSD-REQ message instructs the MS 102 to release the radio resource of MCBCS traffic corresponding to the MCBCS to leave.

Upon receipt of the DSD-RSP message, the BS1 112 releases, if the MS1 102 is the last MS receiving the MCBCS traffic, the radio resource corresponding to MCBCS traffic, and transmits the ASN GW1 120 an MCBCS Leave Response (MCBCS_Leave-RSP) message including the resource lease result (S916). Here, the ASN GW1 received the MCBCS_Leave-RSP message completes the MCBCS leave procedure by deleting all contexts related to the MS 102, and releases the connection with MS 102. At this time, the ASN GW2 130 of the anchor ASN checks whether the MS 102 released the connection is the last MS providing the MCBCS content through the serving ASN within the MBS zone (S918). That is, the ASN GW2 130 determines the MCBCS content to be transmitted to the MS 102 is the last MCBCS content for the MS 102 and, if it is, the MCBCS server 140 initializes the MCBCS.

Also, the ASN GW1 120 performs a data path deregistration procedure with the BS1 120. That is, the ASN GW1 120 transmits a Path Deregistration Request (Path_DREG-REQ) message to the BS1 112 for deregistering the data path registered in the MCBCS join procedure of FIG. 8 (S920), and the BS1 112 transmits a Path Deregistration Response (Path_DREG-RSP) message to the ASN GW1 120 in response to the Path_DREG-REQ message (S922). Upon receipt of the Path_DREG-RSP message, the ASN GW1 120 transmits a Multicast Tree Leave message to the MCBCS server 140 to leave the multicast tree (S924). Consequently, the MS 102, ASN GW1 120, and the MCBCS server 140 leaves the MCBCS, whereby the WiMAX system stops providing MCBCS to the MCBCS zone.

If it is determined that the MS 102 released the connection is not the last MS receiving the MCBCS content through the serving ASN at step S918, i.e. there is at least one other MS receiving the MCBCS content transmitted by the ASN GW1 120, the ASN GW1 120 does not perform the data path deregistration and transmission of the Multicast Tree Leave message.

Figure 10:
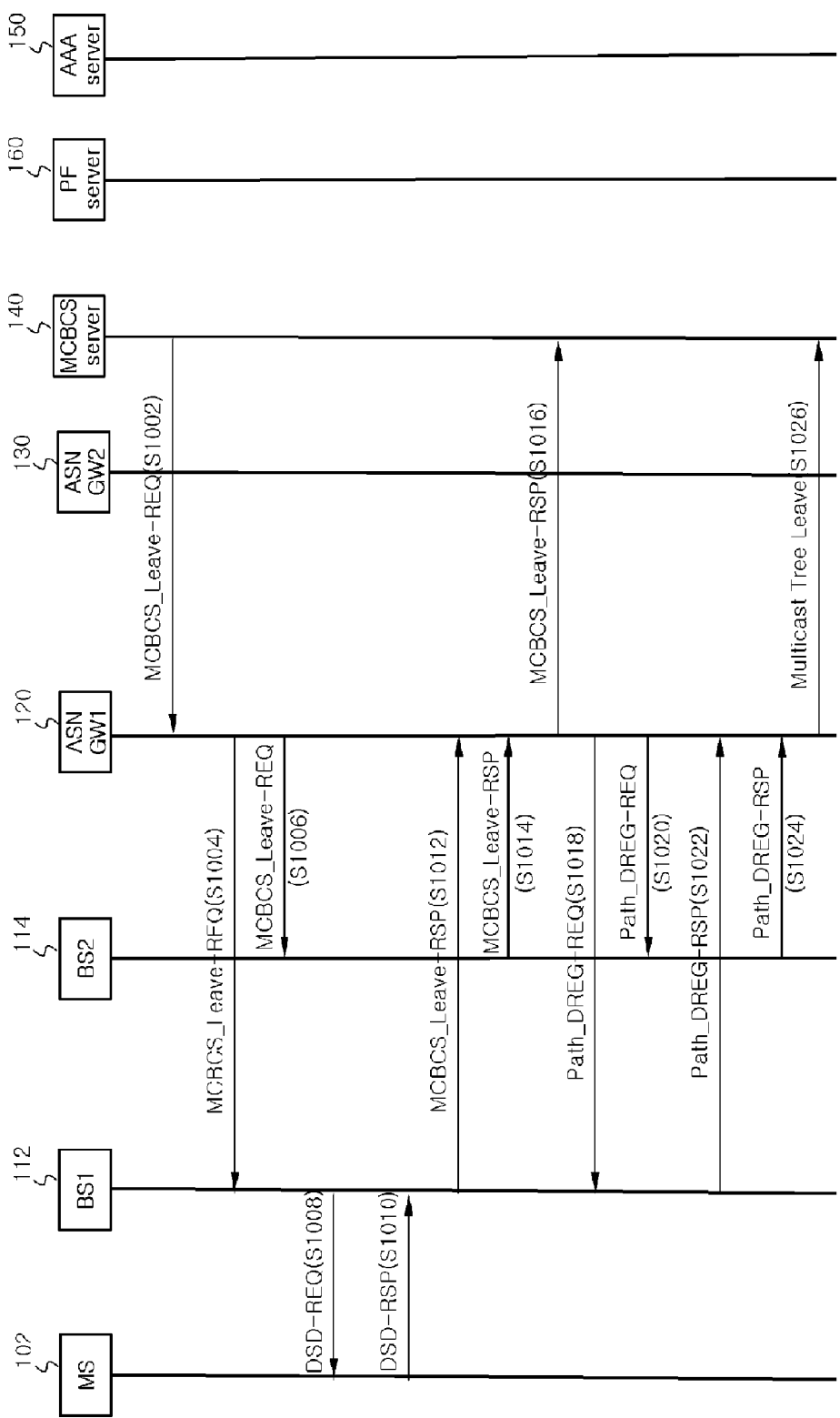
FIG. 10 is a signaling diagram illustrating an MCBCS leave procedure in a communication system according to another embodiment of the present invention.

FIG. 10 is a signaling diagram illustrating an MCBCS leave procedure in a communication system according to another embodiment of the present invention. FIG. 10 shows an MCBCS leave procedure in a case in which the WiMAX system having provided the MCBCS to MCBCS joining MS with dynamic multicast service scheme as depicted in FIG. 8, the MCBCS is not existed to be provided by the WiMAX system (e.g. the MCBCS server requests an MCBCS leave).

Referring to FIG. 10, when MCBCS data is not existed to be provide to MBS zone by the WiMAX system, which having provided the MCBCS with dynamic multicast service scheme by performing the MCBCS join procedure with the MS 102 as depicted in FIG. 8, the MCBCS server 140 transmits an MCBCS_Leave-REQ message to the ASN GW1 120 of the serving ASN (S1002). Upon receipt of the MCBCS_Leave-REQ message, the ASN GW1 120 transmits the MCBCS_Leave-REQ message to all BSs (i.e. the BS1 112 and BS2 114) within the MBS zone defined by the MCBCS server 140 (S1004 and 1006).

Upon receipt of the MCBCS_Leave-REQ message, each of the BS 112 and 114 performs a DSD procedure with all MSs within the MBS zone. That is, the serving BS (i.e. BS1 112) of the MS 102 transmits a DSD-REQ message to the MS 102 (S1008), and the MS 102 transmits a DSD-RSP message to the BS1 112 in response to the DSD-REQ message (S1010). In this embodiment, it is assumed that, among the BS1 112 and the BS2 114, the BS1 112 is the serving BS of the MS 102. The DSD-REQ message instructs the MS 102 to release the radio resource of MCBCS traffic corresponding to the MCBCS to leave. Upon receipt of the DSD-RSP message, each of the BS1 112 and BS114 releases the radio resource corresponding to the MCBCS traffic, if the MS performed the DSD procedure is the last MS receiving the MCBCS traffic (particularly, the BS1 112 releases the radio resource corresponding to the MCBCS traffic receiving from the MS 102), and transmits an MCBCS_Leave-RSP message including the radio resource release result to the ASN GW1 120 (S1012 and S1014).

Upon receipt of the MCBCS_Leave-RSP message, the ASN GW1 deletes all contexts related to the MS 102. The ASN GW1 120 also transmits the MCBCS_Leave-RSP message to the MCBCS server 140 in response to the MCBCS_Leave-REQ message (S1016). The MCBCS server 140 received the MCBCS_Leave-RSP message deletes the MS (i.e. MS 102) information mapped by IP multicast address.

Next, the ASN GW1 112 of the serving ASN performs a data path deregistration procedure with the BSs 112 and 114. That is the ASN GW1 112 transmits a Path_DREG-REQ message to the BS1 112 and BS2 114 for requesting deregistration of the data path registered in the MCBCS join procedure of FIG. 8 (S1018 and S1020), and each of the BS1 112 and BS2 114 transmits the ASN GW1 112 a Path_DREG-RSP message including deregistration result of the data path in response to the Path_DREG-REQ message (S1022 and S1024). Upon receipt of the Path_DREG-REQ message, the ASN GW1 transmits a Multicast Tree Leave message to the MCBCS server 140 for leaving from a multicast tree (S1026). Consequently, the data path among the MCBCS server 140, serving ASN, and MS 102 is released, the WiMAX system stops providing MCBCS to the MBS zone. A method for providing MCBCS to an MS with dynamic multicast service scheme in idle mode of the MS is described hereinafter.

Figure 11:
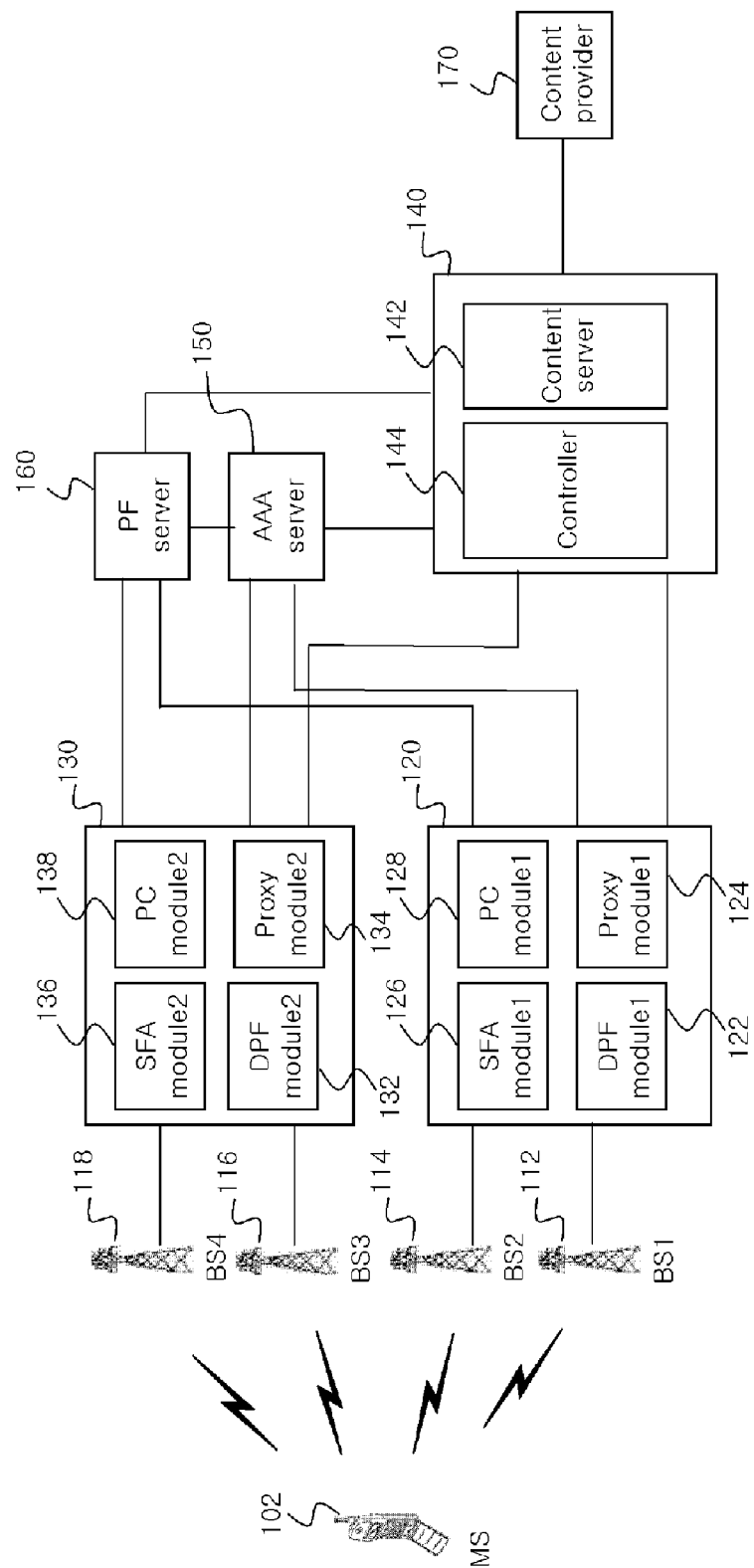
FIG. 11 is a schematically diagram illustrating a structure of a WiMAX system for providing MCBCS to an MS in communication system according to another embodiment of the present invention.

FIG. 11 is a schematically diagram illustrating a structure of a WiMAX system for providing MCBCS to an MS in communication system according to another embodiment of the present invention. FIG. 2 shows a structure of a WiMAX system to provide the MCBCS with dynamic multicast service scheme in idle mode of the MS.

Referring to FIG. 11, the WiMAX system is composed in the same structure as the WiMAX system depicted in FIG. 1 except that the ASN GW1 120 of the serving ASN includes a Path Control (PC) module1 128 for controlling data paths of MSs, and the ASN GW2 130 of the anchor ASN includes a PC module2 138 for controlling data paths of the MSs within the WiMAX network. When the MSs associated to the anchor ASN to which the PC 128 (or 138) belonged move to another MCBCS zone, or operate in idle mode with the WiMAX system, or the MSs operating in idle mode move to another MCBCS zone, the PC modules 128 and 138 control the data paths of the MSs in the WiMAX system.

Figure 12:
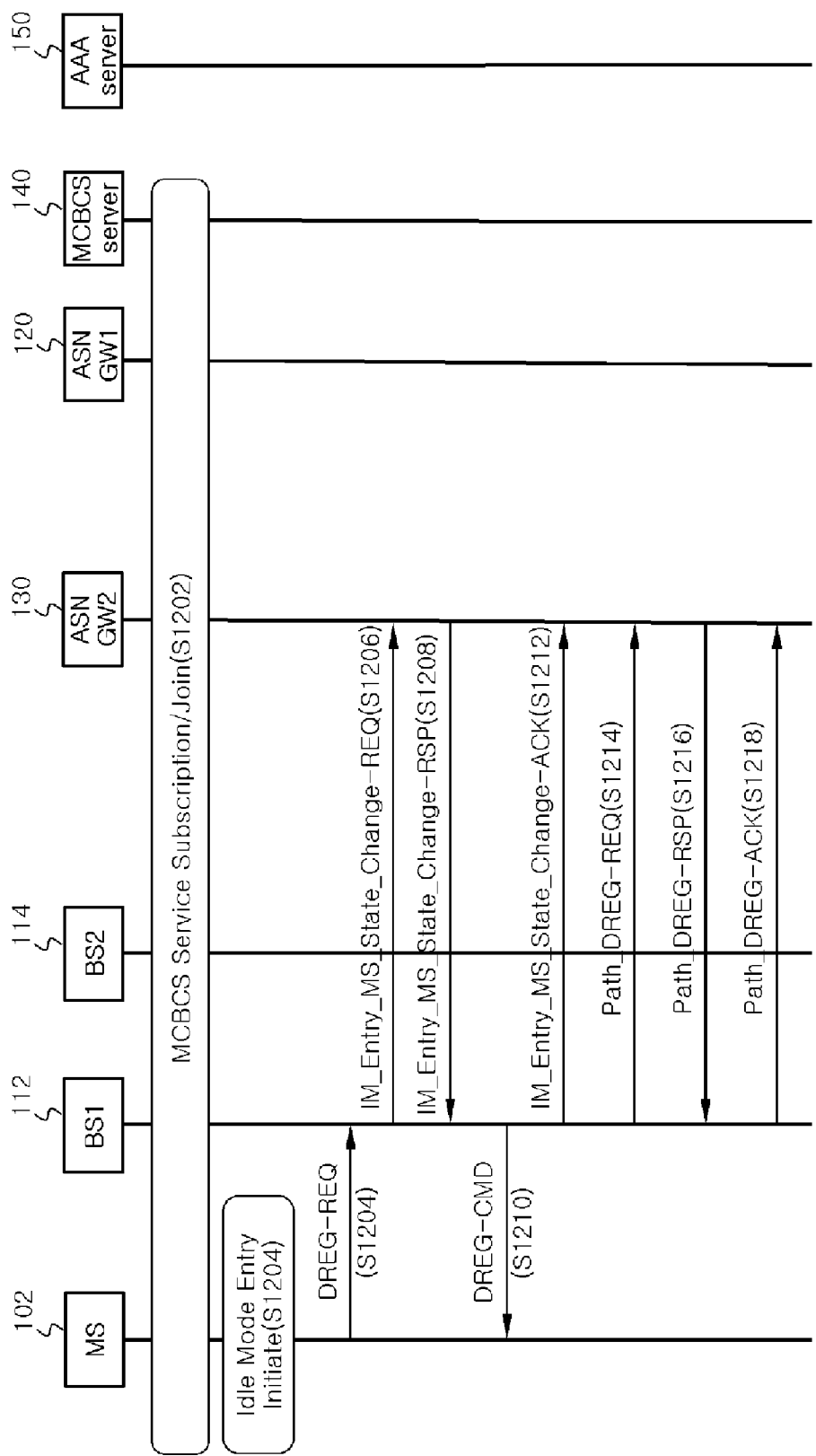
FIG. 12 is a signaling diagram illustrating a procedure for supporting the MCBCS in a communication system according to another embodiment of the present invention.

FIG. 12 is a signaling diagram illustrating a procedure for supporting the MCBCS in a communication system according to another embodiment of the present invention. FIG. 12 shows an MCBCS support procedure in a case in which the WiMAX system the system checks an MS entering idle mode within an MBS zone providing MCBCS with dynamic multicast service scheme and deregisters the data path between the serving BS and the anchor ASN.

Referring to FIG. 12, after the MCBCS subscription/Join procedure has been successfully done (S1202), the MS 102 determines an idle mode entry initiate to enter the idle mode (S1204), and transmits the serving BS (i.e. BS 112) a Deregistration Request (DREG-REQ) message indicating the idle mode entry initiate (S1205). In this embodiment, it is assumed that, among the BS1 112 and the BS2 114, the BS1 112 is the serving BS of the MS 102.

Upon receipt of the DREG-REQ message, the BS1 112 transmits an Idle Mode Entry MS State Change Request (IM_Entry_MS_State_Change-REQ) message for requesting change of the MS's state to the ASN GW2 130 of the anchor ASN (S1206) by entering the idle mode. At this time, the BS1 112 received the DREG-REQ message is admitted to the idle mode entry by the anchor ASN, transmits the ASN GW2 130 the IM_Entry_MS_State_Change-REQ message so that parameters are acquired to enter the idle mode. The IM_Entry_MS_State_Change-REQ message includes an ID of MBS zone currently existed the MS 102 and an ID of the serving ASN providing the MCBCS the MS 102.

Upon receipt of the IM_Entry_MS_State_Change-REQ message, the ASN GW2 130 transmits the BS1 112 an Idle Mode Entry MS State Change Response (IM_Entry_MS_State_Change-RSP) message including paging information (e.g. paging group ID, paging cycle, and paging offset, etc.) in response to the IM_Entry_MS_State_Change-REQ message (S1208).

Upon receipt of the IM_Entry_MS_State_Change-RSP message, the BS1 112 transmits a Deregistration/Re-registration Command (DREG_CMD) message to the MS 102 in response to the DREG-REQ message (S1210). The DREG_CMD message has a path identifier field indicating position of the paging cycle and paging offset which are assigned to MS 102 by the ASN GW2 130 of the anchor ASN. Also, the BS1 112 received the IM_Entry_MS_State_Change-RSP message transmits an Idle Mode Entry MS State Change Acknowledgement (IM_Entry_MS_State_Change-ACK) message to the ASN GW2 114 in response to the IM_Entry_MS_State_Change-RSP message (S1212). Next, the BS1 112 terminates the resource management with a time, and transmits the ASN GW2 130 a Path Deregistration Request (Path_DREG-REQ) message for requesting data path Deregistration by including recommended paging parameters (S1214).

Upon receipt of the Path_DREG-REQ message, the ASN GW2 130 deregisters the data path corresponding to the service flow to the MS 102, and transmits the BS1 112 a Path Deregistration Response (Path_DREG-RSP) message indication the data path deregistration in response to the Path_DREG-REQ message (S1216).

Upon receipt of the Path_DREG-RSP message, the BS1 112 transmits the ASN GW2 130 a Path Deregistration Acknowledgement (Path_DREG-ACK) message in response to the Path_DREG-RSP message (S1218). Consequently, the WiMAX system deregisters the data path for the MS 102, i.e. between the BS1 112 and the anchor ASN, operates with the MS 102 in the idle mode.

As aforementioned, when the WiMAX system checks the MS 102 initiated the idle mode entry within the MBS zone providing MCBCS with dynamic multicast service scheme, the WiMAX system deregisters the data path for the MS, i.e. the data path established via the BS1 112 and the ASN GW2 130 of the anchor ASN, thereby dynamically managing the data paths.

Figure 13:
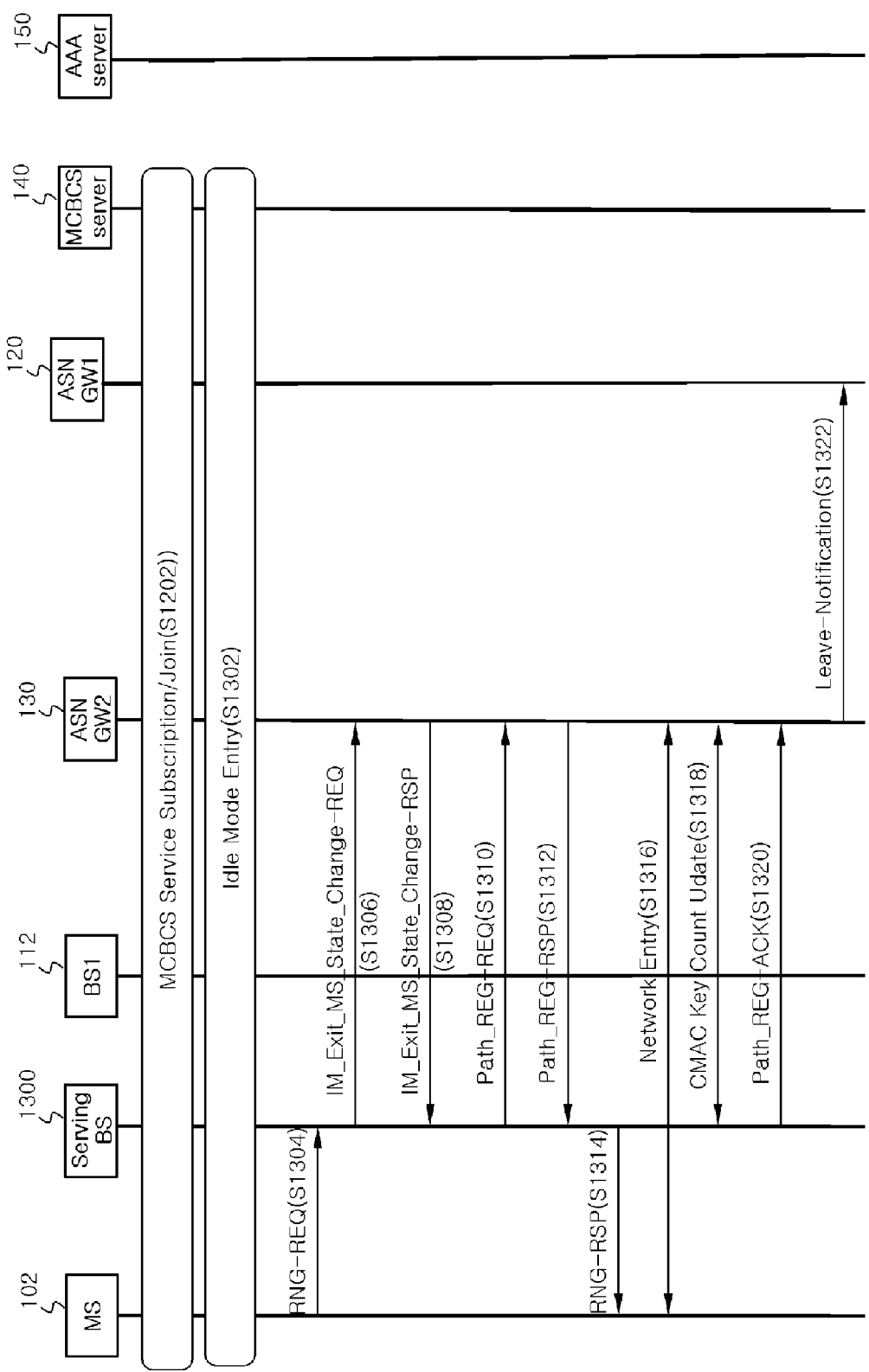
FIG. 13 is a signaling diagram illustrating a procedure for supporting the MCBCS in a communication system according to another embodiment of the present invention.

FIG. 13 is a signaling diagram illustrating a procedure for supporting the MCBCS in a communication system according to another embodiment of the present invention. FIG. 13 shows an MCBCS support procedure in a case in which the WiMAX system the system checks an MS exiting from idle mode (e.g. entering active mode from idle mode) within an MBS zone providing MCBCS with dynamic multicast service scheme and registers the data path between the serving BS and the anchor ASN of the MS. Particularly, FIG. 13 shows an MCBCS support procedure in a case in which the MS operating in the idle mode moves to another MBS zone and exits from the idle mode within the new MBS zone.

Referring to FIG. 13, as depicted in FIG. 8, after in a case when the MS 102 performed the MCBCS Subscription and Join procedure (S1202) and then operating in idle mode through the Idle Mode Entry procedure (S1302) moves into another MBS zone, the MS 102 transmits its serving BS 1300 a Ranging Request (RNG-REQ) message for registering a data path in the new MBS zone (S1304). That is, the MS 102 exits from the idle mode based on a paging from the new serving BS 1300, and transmits the serving BS 1300 the RNG-REQ message indicating which the MS 102 attempts a network re-entry. The RNG-REQ message includes the MCID and a Cipher Message Authentication Code (CMAC) associated with the MS 102.

Upon receipt of the RNG-REQ message, the serving BS 1300 checks that the MS 102 exits from the idle mode, and transmits the ASN GW2 130 of the anchor ASN an Idle Mode Exit MS State Change Request (IM_Exit MS_State_Change-REQ) message for requesting change of the state of the MS 102 (S1306).

If the IM_Exit MS_State_Change-REQ message is received, then the ASN GW2 130 fetches an authentication key for verifying the RNG-REQ message from an authentication module of the anchor ASN, and transmits the serving BS 1300 an Idle Mode Exit MS State Change Response (IM_Exit_MS_State_Change-RSP) message in response to the IM_Exit_MS_State_Change-REQ message (S1308). Here, the ASN GW2 130 performs authentication to the MS 102, which exits from the idle mode and attempts re-entry the network, using the authentication key.

Upon receipt of the IM_Exit_MS_State_Change-RSP message, the serving BS 1300 triggers its data path, and transmits the ASN GW2 130 a Path Registration (Path_REG- REQ) message for establishing a data path (S1310). That is, the serving BS 1300 requests the anchor ASN of the MS 102 exited from the idle mode for requesting registration of the data path by means of the Path_RE-REQ message.

Upon receipt of the Path_REG-REQ message, the ASN GW2 130 transmits the serving BS 1300 a Path Registration Response (Path_REG-RSP) message confirming the data path registration for the MS within the anchor ASN (S1312).

The serving BS 1300 received the Path_REG-RSP message transmits the MS 102 a Ranging Response (RNG-RSP) message in response to the RNG-REQ message (S1314). The RNG-RSP message includes information required for occupying the service according to maintenance of the idle mode and information indicating success of the CMAC, particularly includes a Handover (HO) Process Optimization parameters required for handover between MBS zones and REG-RSP TLV (Type, Length, and Value).

Once the RNG-RSP message is received, the MS 102 exits from the idle mode, and performs a network re-entry procedure with the ASN GW2 130 (S1316). After the network re-entry procedure has successfully completed, the serving BS 1300 and the ASN GW2 130 of the anchor ASN update the CMAC key counter for the authentication module of the anchor ASN and the MS 102, and the authentication module of the anchor ASN receives the CMAC update for the MS 102 (S1318). Next, the serving BS 1300 transmits the ASN GW2 130 a Path Registration Acknowledgement (Path_REG-ACK) message, indicating which the MS 102 completes network re-entry procedure, in response to the Path_REG-RSP (S1320).

Finally, the ASN GW2 130 deletes the idle mode entry and context related to the MS 102, checks the previous MBS zone ID retained in the context of the MS 102 (i.e. the MBS zone ID being controlled by the BS1 112) and the serving ASN ID associated with the MBS being controlled by the BS1 112), and transmits the ASN GW1 120 a Leave Notification (Leave_Notification) message informing which the MS 102 moves to another MBS zone (S1322).

When the MBS zone ID retained in the context of the MS 102 (i.e. the MBS zone ID before the MS's movement) differs from the MBS zone ID associated with the service BS 1300, the ASN GW2 130 transmits the Leave_Notification message to the ASN GW1 120. The ASN GW1 120 received the Leave_notification message deletes the MS 102 moved to another MBS zone from the MCBCS MS list. Next, the ASN GW1 120 checks whether the MS 102 is the last MS which is provided the MCBCS within the MBS zone of the ASN GW1 120. That is, the ASN GW1 120 checks whether the MS exists to be provided the MCBCS through ASN including the ASN GW1 120. If the MS does not exist to be provided the MCBCS, the ASN GW1 120 performs the data path deregistration procedure of the data path established in the ASN including the ASN GW1 120, deregisters all data path established for providing the MCBCS content. Otherwise, if the MS exists to be provided the MCBCS, the ASN GW1 120 does not perform the data path deregistration procedure.

As aforementioned, when the WiMAX system checks that the MS 102 exits from the idle mode within an MBS zone being provided the MCBCS with dynamic multicast service scheme, the WiMAX system registers a data path corresponding to the MS 102 (i.e. data path between the serving BS 1300 of the MS 102 and the ASN GW2 130 of the anchor ASN within MBS zone), and deregisters the data path of the MS 102 within the ASN of the previous MBS zone. When there is no other MS within the old MBS zone, the WiMAX system deregisters all data paths registered for providing the MCBCS content within the ASN corresponding to the old MBS zone, whereby the data paths are managed dynamically.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

The invention claimed is:

1. A method for providing Multicast and Broadcast Service (MCBCS) in a wireless communication system, the method comprising:

receiving, at an Access Service Network Gateway (ASN GW), a leave message from a mobile station to stop being provided with an MCBCS;

transmitting, at the ASN GW, a leave indication message to an MCBCS server upon receipt of the leave message, receiving a first leave response message from the MCBCS server according to the leave indication message, and transmitting a leave request message to a base station according to the first leave response message;

performing, at the base station, a dynamic service deletion procedure with the mobile station upon receipt of the leave request message, and transmitting a second leave response message to the ASN GW according to the leave request message; and receiving, at the ASN GW, the second leave response message from the base station, transmitting, if the mobile station is the last mobile station within an Multicast and Broadcast Service (MBS) zone, a path deregistration request message to the base station, receiving a path deregistration response message from the base station according to the path deregistration request message, transmitting a multicast tree leave message to the MCBCS server according to the path deregistration response message, and leaving a multicast tree.

2. A method for supporting Multicast and Broadcast Service (MCBCS) in a wireless communication system, the method comprising:

detecting, at a base station, an initiate entry into an idle mode of a mobile station within a Multicast and Broadcast Service (MBS) zone by receiving a deregistration request message from the mobile station, and transmitting a path deregistration request message to an Access Service Network Gateway (ASN GW) by detecting the initiate entry into the idle mode;

transmitting, at the ASN GW, a path deregistration response message to the base station upon receipt of the path deregistration request message, and updating an identifier of the MBS zone and an identifier of a serving network corresponding to the mobile station in a context of the mobile station;

detecting, at the base station, an exit from the idle mode of the mobile station within the MBS zone by receiving a ranging request message from the mobile station, and transmitting a path registration request message corresponding to the mobile station to the ASN GW by detecting the exit from the idle mode; and transmitting, at the ASN GW, a path registration response message to the base station upon receipt of the path registration request message, and transmitting a leave notification message to the serving network by identifying the identifier of the MBS zone and an identifier of an MBS zone retained in the context of the mobile station.

3. The method of claim 2, further comprising:
transmitting, at the base station, a mode change request message of the mobile station to the ASN GW, and receiving a mode change response message of the mobile station from the ASN GW in response to the mode change request message; and wherein the mode change request message includes the identifier of the MBS zone and the identifier of the serving network.

\* \* \* \* \*